(12) United States Patent
Cordingley et al.

(10) Patent No.: US 9,036,247 B2
(45) Date of Patent: May 19, 2015

(54) SYSTEMS AND METHODS FOR PROVIDING TEMPERATURE STABILITY OF ACOUSTO-OPTIC BEAM DEFLECTORS AND ACOUSTO-OPTIC MODULATORS DURING USE

(71) Applicant: Electro Scientific Industries, Inc., Portland, OR (US)

(72) Inventors: James Cordingley, Littleton, MA (US); Dimitry Maltsev, Carlisle, MA (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 14/056,999

(22) Filed: Oct. 18, 2013

(65) Prior Publication Data
US 2014/0098410 A1 Apr. 10, 2014

Related U.S. Application Data

(62) Division of application No. 13/542,177, filed on Jul. 5, 2012, now Pat. No. 8,593,722.

(60) Provisional application No. 61/504,563, filed on Jul. 5, 2011.

(51) Int. Cl.
*G02F 1/33* (2006.01)
*G02F 1/11* (2006.01)

(52) U.S. Cl.
CPC . *G02F 1/33* (2013.01); *G02F 1/113* (2013.01); *G02F 2203/21* (2013.01)

(58) Field of Classification Search
CPC ........... G02F 1/33; G02F 1/11; H01S 3/1068; H01S 3/117; H01S 3/127; B23K 26/038; B23K 26/06; B23K 26/0635; B23K 26/0639
USPC .............. 219/121.6, 121.61, 121.62, 121.65, 219/121.67, 121.78, 121.82; 359/285, 286, 359/305, 307, 310
See application file for complete search history.

(56) References Cited

U.S. PATENT DOCUMENTS 3,480,368 A 11/1969 Erf et al.
3,688,388 A 9/1972 Dyment et al.
(Continued)

FOREIGN PATENT DOCUMENTS

JP 10-153806 A 6/1998
JP 10-305384 A 11/1998
(Continued)

OTHER PUBLICATIONS

International Search Report and Written Opinion mailed on Dec. 26, 2012 in connection with International Patent Appln. No. PCT/US12/45534 filed on Jul. 5, 2012.
(Continued)

*Primary Examiner* — David N Spector

(57) ABSTRACT

The invention provides a method of laser processing with a thermally stabilized acousto-optic beam deflector. The method includes the steps of: generating a sequence of RF pulses corresponding to a sequence of laser pulses having a laser pulse repetition rate, the RF pulses including transmitting RF pulses at transmitting RF frequencies and non-transmitting RF pulses at non-transmitting RF frequencies for causing the sequence of laser pulses to be deflected in respective transmitting and non-transmitting directions, each RF pulse comprising an RF frequency, an RF amplitude and a duration; controlling each RF pulse such that the sequence of RF pulses provides a modulated RF drive signal that is modulated to provide a balanced thermal loading on the acousto-optic deflector; applying the modulated RF drive signal to the acousto-optic deflector; and deflecting at least one laser pulse with the acousto-optic deflector using the modulated RF drive signal to irradiate a selected target position with a predetermined pulse energy.

35 Claims, 21 Drawing Sheets

(56) References Cited

U.S. PATENT DOCUMENTS

| | | |
|---|---|---|
| 4,176,327 A | 11/1979 | Wayne et al. |
| 4,930,901 A | 6/1990 | Johnson et al. |
| 5,041,716 A | 8/1991 | Wakabayashi |
| 5,197,074 A | 3/1993 | Emmons, Jr. et al. |
| 5,226,051 A | 7/1993 | Chan et al. |
| 5,347,392 A | 9/1994 | Chen et al. |
| 5,509,022 A | 4/1996 | Lowery et al. |
| 5,590,141 A | 12/1996 | Baird et al. |
| 5,712,722 A | 1/1998 | Kump et al. |
| 5,742,425 A | 4/1998 | Kump et al. |
| 5,748,655 A | 5/1998 | Yessik et al. |
| 5,751,585 A | 5/1998 | Cutler et al. |
| 6,057,180 A | 5/2000 | Sun et al. |
| 6,144,118 A | 11/2000 | Cahill et al. |
| 6,172,325 B1 | 1/2001 | Baird et al. |
| 6,181,728 B1 | 1/2001 | Cordingley et al. |
| 6,197,133 B1 | 3/2001 | Unternahrer et al. |
| 6,281,471 B1 | 8/2001 | Smart |
| 6,295,157 B1 | 9/2001 | Allen et al. |
| 6,300,590 B1 | 10/2001 | Lauer et al. |
| 6,339,604 B1 | 1/2002 | Smart |
| 6,340,806 B1 | 1/2002 | Smart et al. |
| 6,483,071 B1 | 11/2002 | Hunter et al. |
| 6,489,985 B1 | 12/2002 | Brodsky et al. |
| 6,559,412 B2 | 5/2003 | Lauer et al. |
| 6,574,250 B2 | 6/2003 | Sun et al. |
| 6,593,542 B2 | 7/2003 | Baird et al. |
| 6,639,177 B2 | 10/2003 | Ehrmann et al. |
| 6,765,709 B1 | 7/2004 | Montgomery et al. |
| 6,781,090 B2 | 8/2004 | Sun et al. |
| 6,784,399 B2 | 8/2004 | Dunsky et al. |
| 6,806,440 B2 | 10/2004 | Sun et al. |
| 6,947,454 B2 | 9/2005 | Sun et al. |
| 6,951,995 B2 | 10/2005 | Couch et al. |
| 7,133,182 B2 | 11/2006 | Johnson et al. |
| 7,227,098 B2 | 6/2007 | Bruland et al. |
| 7,245,412 B2 | 7/2007 | Bruland et al. |
| 7,301,981 B2 | 11/2007 | Sun et al. |
| 7,348,516 B2 | 3/2008 | Sun et al. |
| 7,372,878 B2 | 5/2008 | Nilsen et al. |
| 7,394,476 B2 | 7/2008 | Cordingley et al. |
| 7,402,774 B2 | 7/2008 | Kitai et al. |
| 7,466,466 B2 | 12/2008 | Ehrmann et al. |
| 7,616,669 B2 | 11/2009 | Grant et al. |
| 7,666,759 B2 | 2/2010 | Couch et al. |
| 8,080,668 B2 | 12/2011 | Potluri et al. |
| 8,269,137 B2 | 9/2012 | Ehrmann et al. |
| 2002/0167581 A1 | 11/2002 | Cordingley et al. |
| 2004/0202207 A1 | 10/2004 | Wang |
| 2005/0224469 A1 | 10/2005 | Cutler et al. |
| 2006/0027540 A1 | 2/2006 | Bruland et al. |
| 2007/0012667 A1 | 1/2007 | Hemenway et al. |
| 2007/0199927 A1 | 8/2007 | Gu et al. |
| 2007/0228024 A1 | 10/2007 | Bruland et al. |
| 2008/0017618 A1 | 1/2008 | Bruland et al. |
| 2008/0029491 A1 | 2/2008 | Johnson et al. |
| 2008/0164240 A1 | 7/2008 | Cordingly et al. |
| 2009/0016388 A1 | 1/2009 | Gu et al. |
| 2009/0095722 A1 | 4/2009 | Ehrmann et al. |
| 2009/0242531 A1 | 10/2009 | Baird et al. |
| 2010/0183040 A1 | 7/2010 | Ishizu et al. |
| 2011/0210105 A1 | 9/2011 | Romashko et al. |
| 2011/0297851 A1 | 12/2011 | Lauer et al. |
| 2012/0241427 A1 | 9/2012 | Maltsev et al. |
| 2013/0200050 A1 | 8/2013 | Ehrmann et al. |

FOREIGN PATENT DOCUMENTS

| | | |
|---|---|---|
| JP | 11-163533 A | 6/1999 |
| JP | 2001-79674 A | 3/2001 |
| TW | 270261 B | 2/1996 |
| TW | 508879 B | 11/2002 |
| WO | 8700300 A1 | 1/1987 |
| WO | 0185734 A1 | 11/2001 |
| WO | 03/052890 A1 | 6/2003 |
| WO | 2010138897 A2 | 12/2010 |
| WO | 2013006691 A2 | 1/2013 |
| WO | WO 2013006691 A2 * | 1/2013 |

OTHER PUBLICATIONS

International Preliminary Report on Patentability mailed on Jan. 16, 2014 in connection with International Patent Appln. No. PCT/US12/45534 filed on Jul. 5, 2012, 6 pages.

Y. Wang, et al., "Pulse Selection From a Mode-Locked TE CO2 Laser Output Using a Resonant Acousto-Optic Modulator", SPIE vol. 3268, p. 70-80.

Vladimir Balakshy, et al., "Compensation of Thermal Effects in Acousto-Optic Deflector", SPIE vol. 2713, Department of Pysics, Mosco State University, Russia, p. 164-170.

* cited by examiner

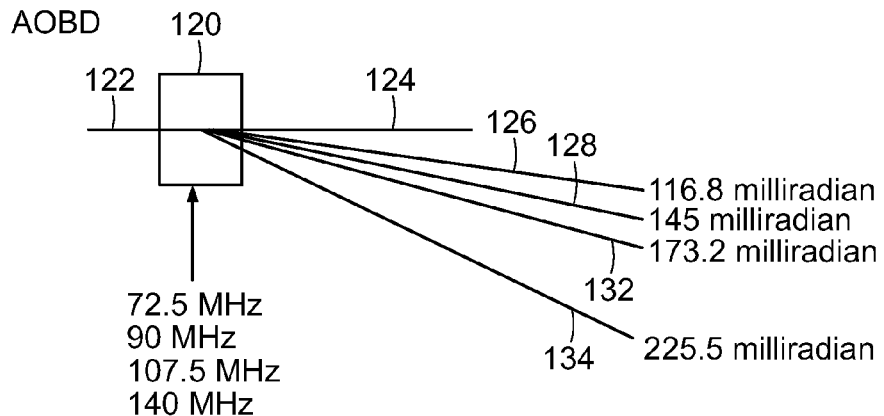
FIG. 6
FIG. 7A
FIG. 7B
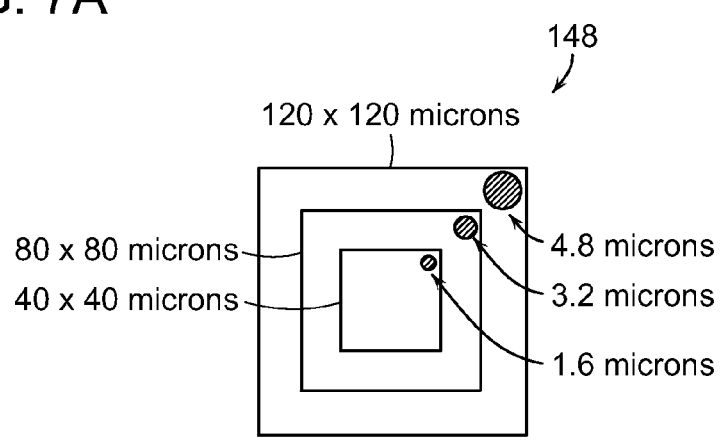
FIG. 7C

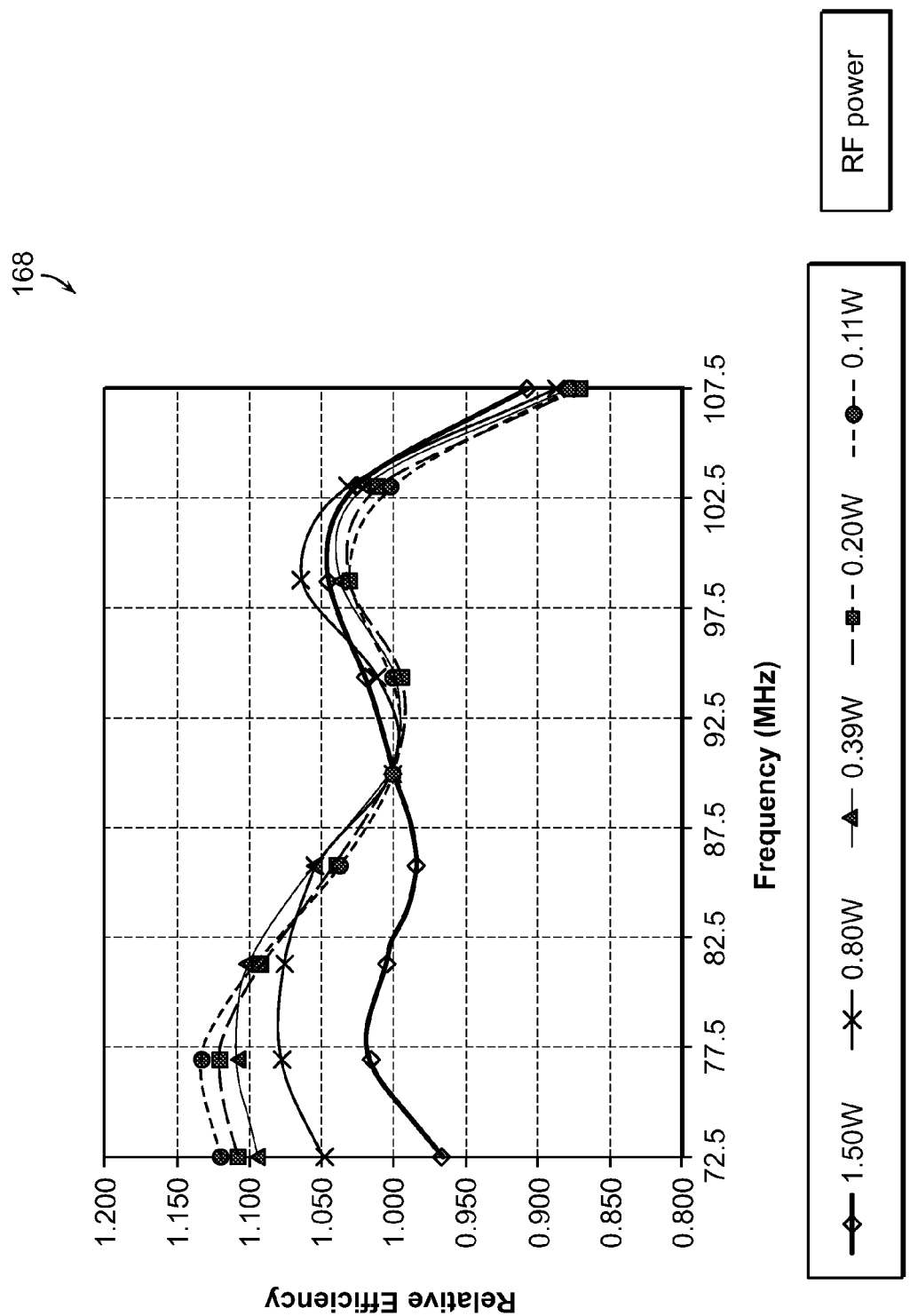

SYSTEMS AND METHODS FOR PROVIDING TEMPERATURE STABILITY OF ACOUSTO-OPTIC BEAM DEFLECTORS AND ACOUSTO-OPTIC MODULATORS DURING USE

PRIORITY

This application is a divisional application of U.S. application Ser. No. 13/542,177 filed on Jul. 5, 2012, (now U.S. Pat. No. 8,593,722) which claims priority to U.S. Provisional Patent Application Ser. No. 61/504,563 filed Jul. 5, 2011, the entire disclosures of which are hereby incorporated by reference in their entirety.

BACKGROUND

The invention generally relates to acousto-optic beam deflectors (AOBD) and acousto-optic modulator (AOM) devices, and relates in particular to control systems for such devices.

Acousto-optic beam deflector devices and acousto-optic modulator devices are well-known in the field of laser processing systems and are useful for high-speed beam positioning. U.S. Patent Application Publication No. 2008/0164240 discloses systems and methods for multi-pulse laser processing that includes an AOM device that is driven by a radio frequency (RF) drive signal that is amplitude modulated to provide impingement and non-impingement intervals to respectively transmit or block laser pulses. U.S. Patent Application Publication No. 2009/0095722 discloses systems and methods for laser processing (cutting) links in a memory device in memory repair applications wherein one or more AOBD is configured to deflect the processing laser beam.

Acousto-optic beam devices however, can be temperature sensitive. With passive cooling, RF power applied at constant rate may maintain constant device temperature, but RF power used to deflect beams in certain laser processing application is intermittent.

U.S. Pat. Nos. 5,712,722 and 5,742,425 disclose the use of a modulator that receives multiple RF carrier signals, and produces a constant RF power signal to an AOM. These patents disclose that by choosing the compensating power level, the spatial thermal energy distribution inside the AOM may remain substantially constant.

U.S. Pat. No. 6,295,157 discloses the use of two different RF signals for simultaneously driving an AOM. The power level of each one RF signal is adjusted for pattern writing, and the sum of the load power of both RF signals is disclosed to be maintained substantially constant.

U.S. Pat. No. 6,765,709 discloses the use of electro-thermal strips that are disclosed to provide thermal compensation for transient thermal effects in the bulk material of an optical modulator system. The electro-thermal strips, however, are disclosed to introduce a desired thermal energy to the bulk material to maintain a constant thermal condition.

U.S. Pat. No. 7,616,669 discloses controlling the thermal loading of an AOM by providing RF pulses to the AOM at a constant repetition rate. The RF pulses, however, include RF pulses that are timed to be in coincidence with a laser output, and non-coincident pulses that are not coincident with the laser output. The non-coincident pulses are disclosed to be delayed (e.g., by 0.5 microseconds) such that each occurs immediately after a laser output pulse. The non-coincident pulses are also disclosed to have RF power values and RF durations that are either the same or different than those of the coincident pulses.

There remains a need, therefore, for improved thermal loading methods and systems for maintaining constant or substantially constant AOM and AOBD device temperature.

SUMMARY

In accordance with an embodiment, the invention provides a method of laser processing with a thermally stabilized acousto-optic beam deflector. The method includes the steps of: generating a sequence of RF pulses corresponding to a sequence of laser pulses having a laser pulse repetition rate, the RF pulses including transmitting RF pulses at transmitting RF frequencies and non-transmitting RF pulses at non-transmitting RE frequencies for causing the sequence of laser pulses to be deflected in respective transmitting and non-transmitting directions, each RF pulse comprising an RE frequency, an RF amplitude and a duration; controlling each RF pulse such that the sequence of RF pulses provides a modulated RF drive signal that is modulated to provide a balanced thermal loading on the acousto-optic deflector; applying the modulated RF drive signal to the acousto-optic deflector; and deflecting at least one laser pulse with the acousto-optic deflector using the modulated RF drive signal to irradiate a selected target position with a predetermined pulse energy.

In accordance with another embodiment, the invention provides a method of providing thermal stability in an acousto-optic beam deflector that includes the steps of: providing transmitting RF pulses to the acousto-optic beam deflector to provide that the acousto-optic beam deflector directs a processing laser pulse along an optical path terminating at a target substrate; and providing non-transmitting RF pulses to the acousto-optic beam deflector to provide that the acousto-optic beam deflector directs a non-processing laser pulse along an optical path that terminates without reaching the target substrate, wherein each non-transmitting RF pulse has a pulse characteristic that is selected to provide thermal stability of the acousto-optic beam deflector.

In accordance with a further embodiment, the invention provides a thermally stabilized high speed laser processing system for deflecting laser pulses to selected targets within a laser processing field according to a laser processing sequence. The system includes: a controller for executing a sequence of laser processing commands and for thermally stabilizing system components, the commands including a delivered laser pulse energy command and a delivered laser pulse position command regarding a laser pulse position within the laser processing field, the controller generating one or more deflector control signals responsive to said laser processing commands to thermally stabilize at least one system component; and at least one RF signal generator that is configured to receive a deflector control signal and to generate a respective RF drive signal, each RF drive signal comprising a sequence of transmitting and non-transmitting RF pulses, each transmitting RF pulse characterized by a predetermined transmitting frequency corresponding to a selected target coordinate within the laser processing field and characterized by a respective predetermined thermal load, and each non-transmitting RF pulse characterized by respective non-transmitting frequencies and respective compensatory thermal loads, whereby each RF drive signal provides a stabilized thermal load of transmitting RF pulses and compensatory non-transmitting RF pulses in at least one acousto-optic modulator; wherein the at least one acousto-optic modulator is configured to receive a respective RF drive signal and to deflect laser pulses according to the laser processing sequence to irradiate predetermined target coordinates with predetermined laser pulse energy.

BRIEF DESCRIPTION OF THE DRAWINGS

The following description may be further understood with reference to the accompanying drawings in which:

FIG. 6 shows an illustrative diagrammatic view showing operation of an acousto-optic beam deflector in accordance with certain embodiments of the invention;

FIG. 7A shows an illustrative diagrammatic view of a processing field size on a workpiece in accordance with certain embodiments of the invention;

FIG. 7B shows an illustrative diagrammatic view of a two-dimensional deflection in a processing field of FIG. 7A;

FIG. 7C shows an illustrative diagrammatic view of variable field size properties in accordance with certain embodiments of the invention;

FIGS. 9A and 9B show illustrative graphical representations of AOBD efficiency in accordance with certain embodiments of the invention;

The drawings are shown for illustrative purposes only.

DETAILED DESCRIPTION

Figure 1:
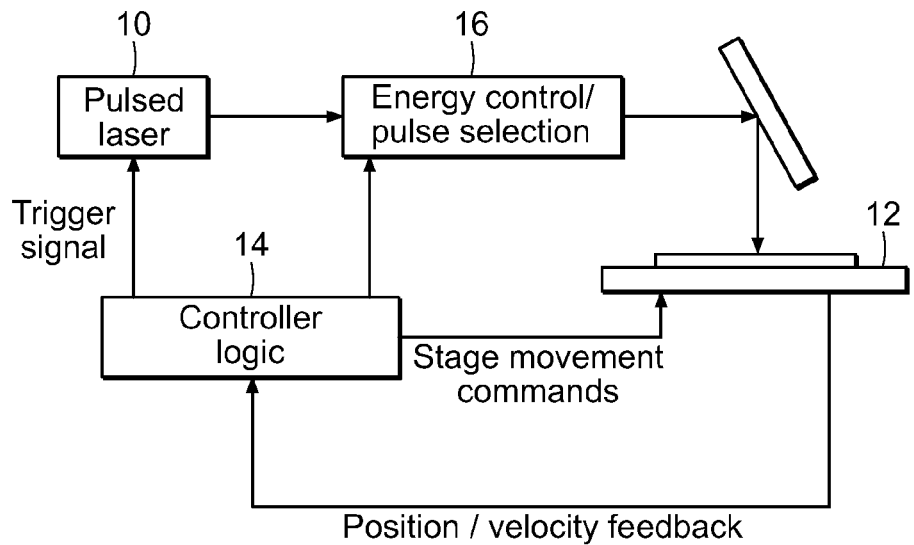
FIG. 1 shows an illustrative diagrammatic view of a laser processing system in which thermal control systems and methods of the invention may be used.
Figure 2:
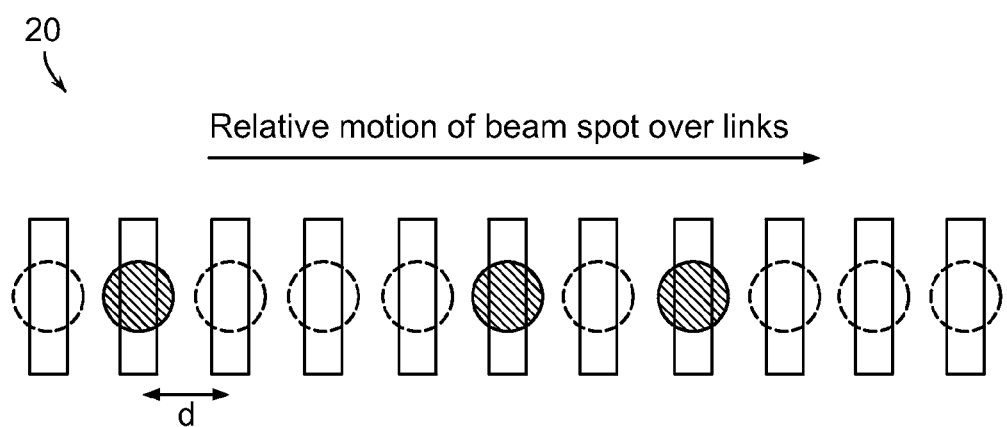
FIG. 2 shows an illustrative diagrammatic plan view of a portion of a row of links illustrating the application of laser pulses to the links.

Acousto-optic beam deflector devices and acousto-optic modulator devices may be used in accordance with various embodiments of the invention in laser processing systems for selecting pulses, for example, for link processing. FIG. 1, for example, shows a laser processing system in which a repeating sequence of laser pulses from a pulsed laser 10, g., a q-switched laser, provides pulses from a sequence of pulse bursts or a sequence of shaped pulses at a predetermined repetition rate. A group of links 20 (as shown in FIG. 2) having a characteristic spacing d is put in motion relative to a processing head at a predetermined velocity V by moving a stage 12 under control of a control computer or logic device 14. Pulses are selectively blocked by an energy control and energy pulse selection system 16.

Generally, modulators operate with high efficiency at a single RF frequency or a small range of RF frequencies whereas deflectors operate with optimized efficiency over a larger range of frequencies; however both types of acousto-optic devices deflect and modulate. For convenience, the terms deflector and AOBD are used where a large deflection range is preferred, however general aspects discussed below apply to beam deflection and modulation that may be provided by an AOM or AOBD. Embodiments of the invention may be used in a wide variety of laser processing applications, including but not limited to the laser processing systems disclosed in U.S. Patent Application Publications Nos. 2008/0164240, 2009/0095722, 2011/0297851 and 2011/0210105 as well as U.S. Provisional Patent Applications Nos. 61/352,316 and 61/446,943 the disclosures of which are hereby incorporated by reference in their entirety.

Figure 3:
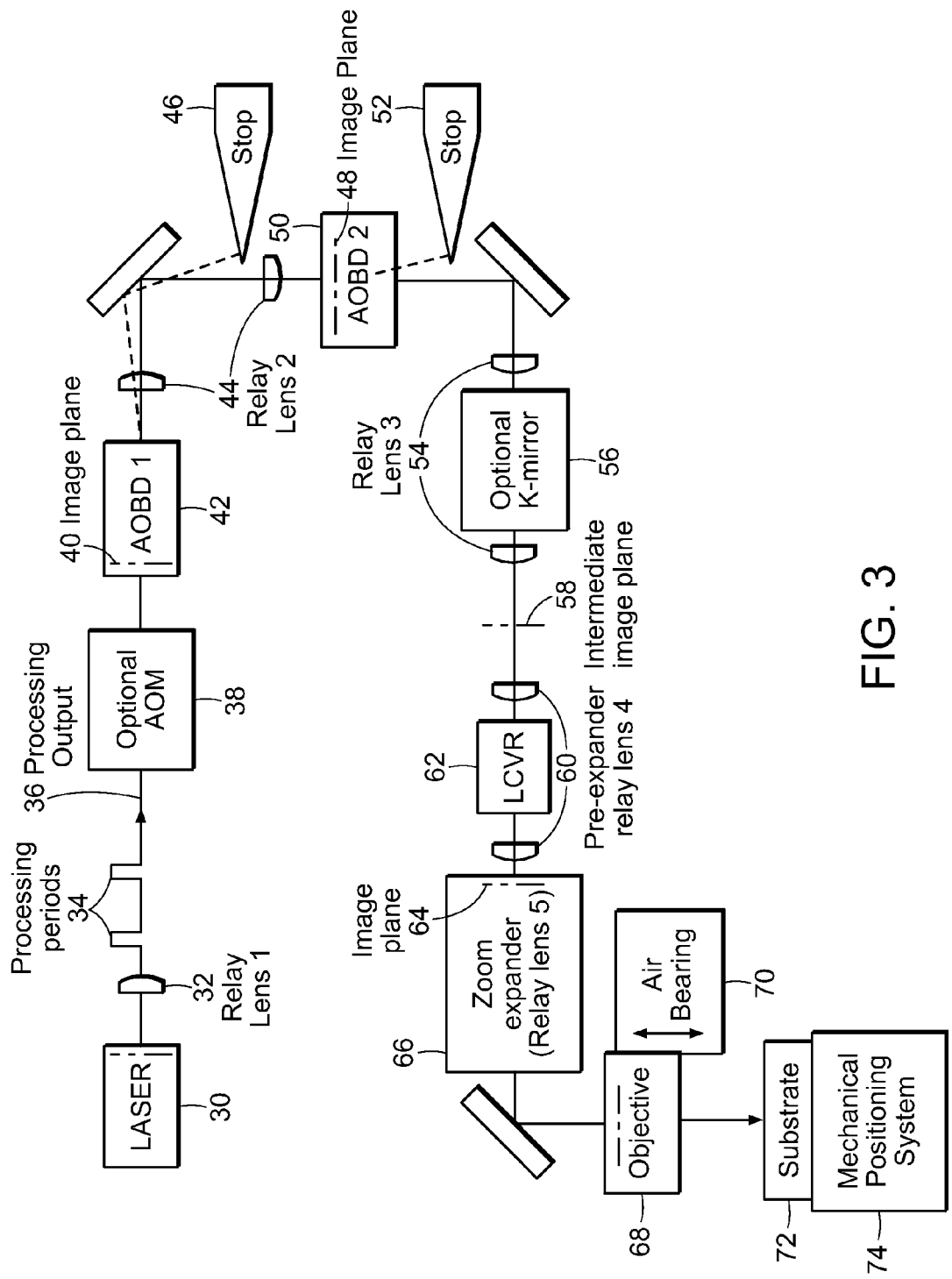
FIG. 3 shows an illustrative diagrammatic view of system elements of a laser processing system in accordance with certain embodiments of the invention.

For example, FIG. 3 schematically shows a system that includes a laser 30 that provides laser pulses for processing. The pulses are gated by an optional AOM 38, then propagate to an image plane 40 of a first AOBD device 42. Pulse energy in the zero order beam of AOBD 42 is passed to beam stop 46 as shown, and pulses deflected in a first axis propagate to an image plane 48 of a second AOBD device 50. Pulse energy in the zero order beam of AOBD device 50 is passed to beam stop 52 and pulses deflected in a second axis (not shown), selected for processing, propagate toward workpiece substrate 72.

The system of FIG. 3 provides a multi-axis inertia-less deflector based laser processing system for link severing that includes therefore, among other elements, a laser source, multi-axis inertia-less deflectors and associated drivers, relay optics, beam expanding optics, spot forming optics, and a mechanical positioning system. In particular, the laser 30 outputs a laser pulse through a first relay lens 32. The laser pulses may occur during processing periods 34. The acousto-optic modulator 38 (AOM) may receive the laser pulse at a processing output 36 for selectively blocking some of the output pulses. In at least some embodiments, this AOM 38 is an optional component in the system. The first beam deflector 42 (AOBD 1) may deflect and/or split the received laser pulse along a first axis as described further below. Relay optics may include relay lenses 44 and mirrors for reflecting the laser along the optical path of the system. The stop 46 prevents unwanted energy of the first deflector 42 from propagating into the second deflector 50 (AOBD 2), and the second deflector 50 may deflect and/or split the laser beam along another axis as will be described further below.

A second stop 52 may prevent unwanted energy from the second deflector 50 from proceeding along the beam path. The beams may proceed through relay optics as shown. The relay optics may include relay lenses 54, optional K-mirror 56 for beam rotation to orient a deflection axis, and relay lenses 60, and an intermediate image plane 58 may be formed as shown diagrammatically. Relay lenses 60 may be formed as pre-expander lenses. A Liquid Crystal Variable Retarder (LCVR) device 62 controls polarization of the pulses. The beams may proceed to an image plane 64 of a zoom expander 66 that is used to set a laser spot size at the target that is brought to focus via an objective (lens system) 68. The objective 68 may focus the beams on the substrate 72 mounted on a mechanical positioning system 74.

One of ordinary skill in the art will recognize that other relay optics and lenses may be employed in order to focus the beams on the substrate 72, reduce aberration or astigmatism, and make the optical system more compact. The objective may be positioned using adjustable air bearing 70 to set a focus height relative to the substrate 72, which is moved on a mechanical positioning system 74 in a plane generally perpendicular to the axis of the objective to position laser spots relative to processing targets. While FIG. 3 shows a single system embodiment, well-known variations in laser beam generation, propagation of laser beams to and from AOBD devices, and other routine aspects of laser beam delivery systems may be employed with thermally stabilized AOBD devices.

The AOBD devices 42 and 50 are Bragg cells that generate a variable diffraction grating by varying the acoustic frequency applied from an RF transducer to an optically transparent bulk acoustic material. For example, the material may be glass or $TeO_2$ and include a piezoelectric transducer attached to the material. The piezoelectric transducer generates the acoustic waves in a frequency range of 25 to 400 MHz. Suitable commercial devices are readily available from a range of models with different performance characteristics. Each model is usually characterized by a center frequency and a frequency bandwidth range. The product of the acoustic velocity of the acoustic material and the RF frequency applied provides the acoustic wavelength in the acoustic material. As the RF frequency varies, the acoustic wavelength is varied resulting in a variable diffraction grating period and a variable diffraction angle.

Figure 4:
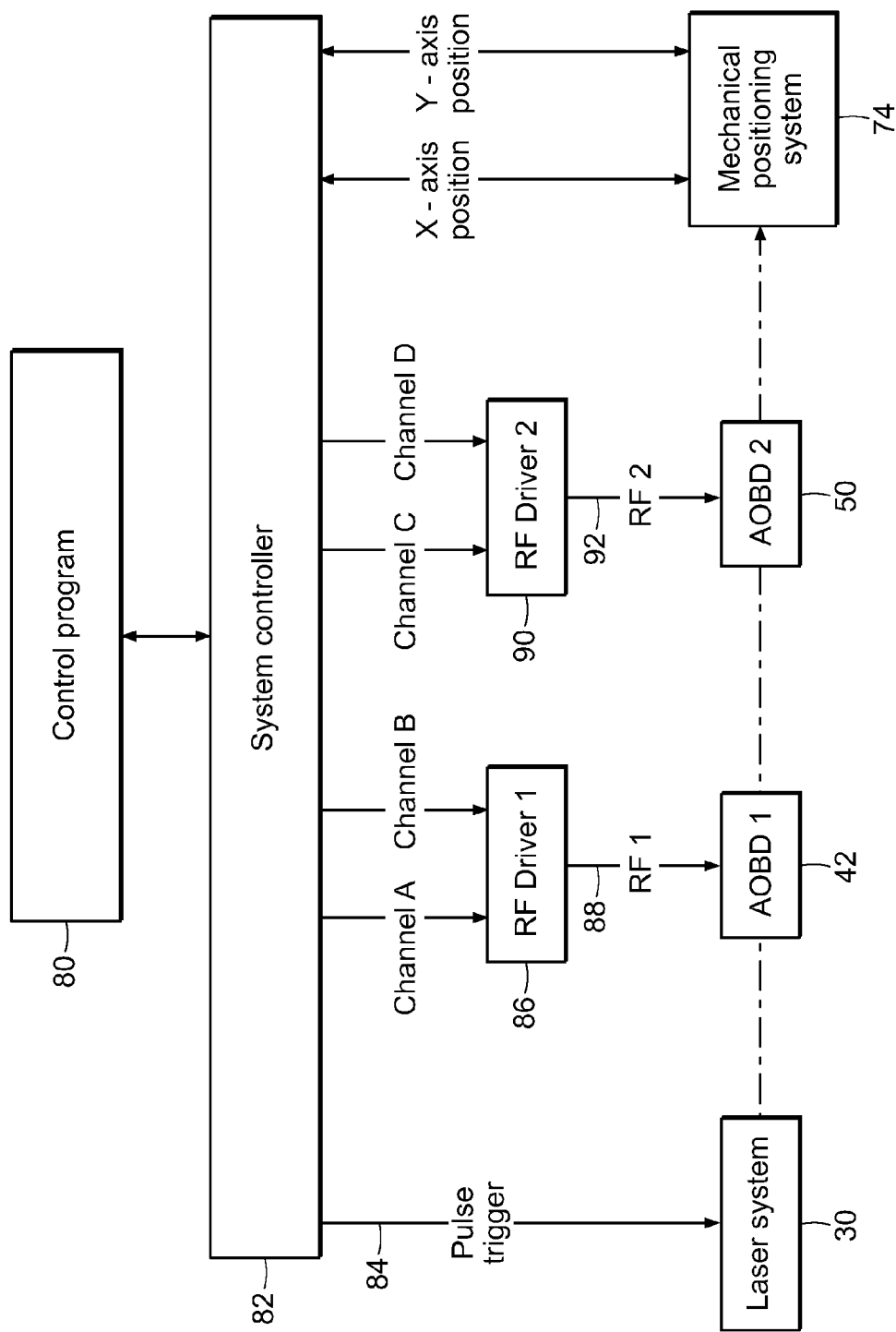
FIG. 4 shows an illustrative diagrammatic view of a laser processing system control architecture in accordance with certain embodiments of the invention.

By controlling the RF signal frequency applied from an RF driver to the transducer, a controllable beam deflection angle is possible within the bandwidth of the device. Outside of the device bandwidth, applied frequencies may not efficiently deflect within operational tolerances of the device. FIG. 4 shows a control system that includes a control program 80 that communicates with a system controller 82 to trigger pulses from laser system 30 via a pulse trigger signal 84. The system controller 82 controls a first RF driver 86 via one or more channels, and the RF driver 86 drives the AOBD device 42 via a first RF signal 88. The system controller 82 also controls a second RF driver 90 via one or more further channels, and the RF driver 90 drives the AOBD device 50 via a second RF signal 92. The system controller 82 also communicates with the mechanical positioning system 23 to control x and y positions of the mechanical positioning system 74 and receives position feedback information from the mechanical positioning system 74. While FIGS. 3 and 4 show multiple AOBD devices, various embodiments may be practiced in a single AOBD system, when using either single or multiple axis deflection.

Typically, AOBD transmission varies with the RF frequency even for a fixed RF amplitude. For example, the center field deflection frequency may have a relatively higher transmission than the frequency that causes deflection to the outermost field angles. This effect can be caused by a varying diffraction efficiency of the AOBD that varies with the deflection angle; the diffraction efficiency falls off at extreme deflection angles. By controlling the RF signal amplitude applied from the RF driver to the transducer, the diffraction efficiency of the AOBD may be and as a result laser power transmitted by the AOBD for processing may be controllably modulated to maintain desired deflected laser pulse energy.

For consistent targeted delivery of precise laser output energy at desired levels, compensating laser pulse energy modulation to correct for efficiency fall off may be applied by controlling the RF amplitude at different frequencies. For example, the RF amplitude may be varied as the inverse of a measured optical transmission curve to provide flattened transmission response over a range of frequencies that deflect laser energy over a processing field.

Figure 5:
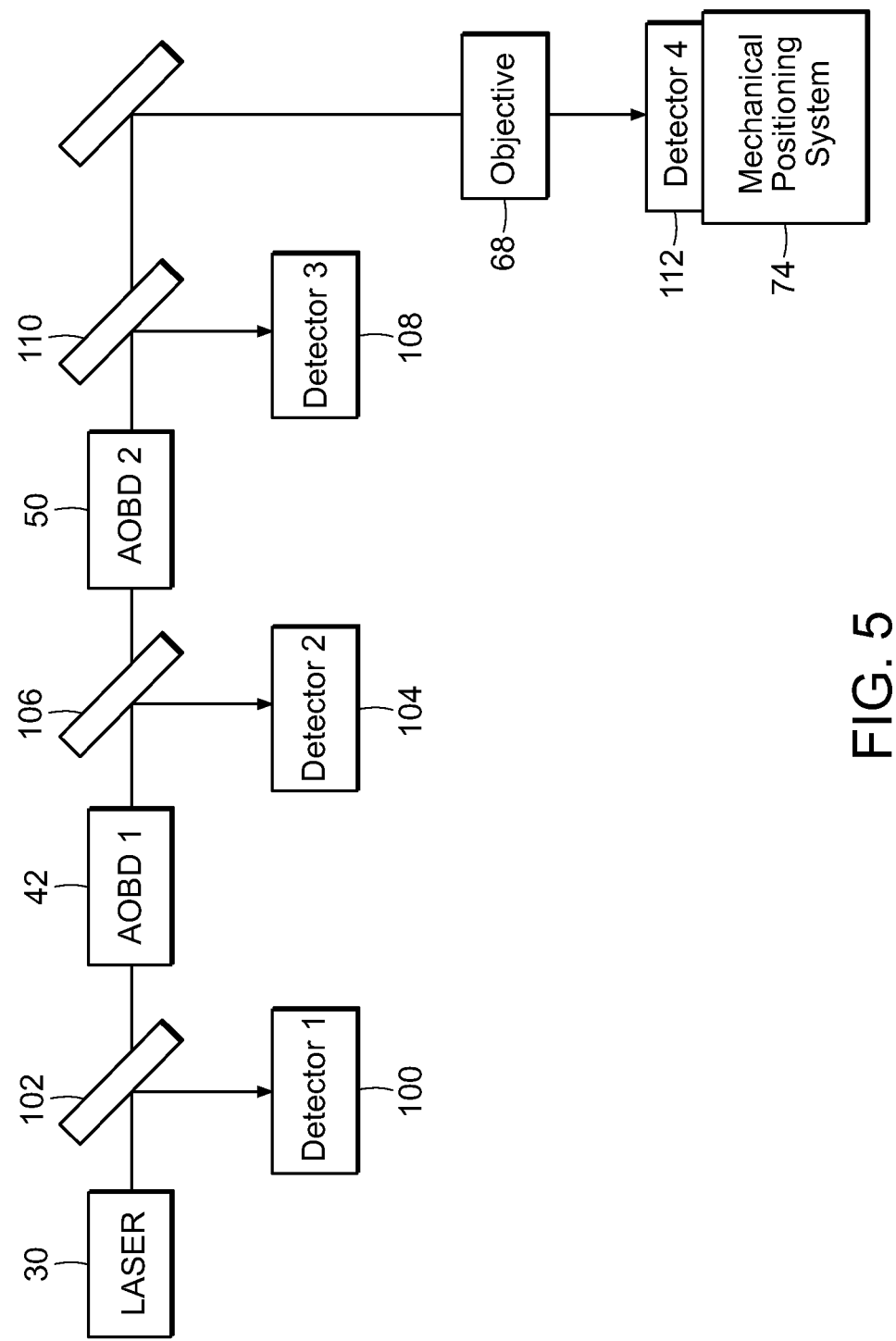
FIG. 5 shows an illustrative diagrammatic view of elements of a laser processing system in accordance with certain embodiments of the invention.

As shown for example in FIG. 5, optical transmission may be measured with optical detectors at various points along the optical path. In particular, a first detector 100 may be positioned to receive a portion of the laser output from the laser 30 via a beam splitter 102. A second detector 104 may be positioned to receive a portion of the output from the first AOBD device 42 via a beam splitter 106, and a third detector 108 may be positioned to receive a portion of output from the second AOBD device 50 via a beam splitter 110. A transmissive detector 112 may also be used in conjunction with the mechanical positioning system 74.

Each detector detects laser pulse energy and/or average laser power. The single detector, or the combination of detectors when multiple detectors are used, may independently calibrate non-linear transmission in the first AOBD 42 by measuring energy before the second AOBD 50. The system may include means to evaluate the difference in pulse energy or average power between pairs of detectors. In conjunction with a detector preceding the first AOBD 42, the first and second AOBD 42 and 50 may be calibrated independently from laser power drift or other upstream factors. The difference in power exiting the second AOBD 50 and the first AOBD 42 may be determined using the multiple detectors. This provides a means for evaluating and calibrating the non-linear transmission of the second AOBD 50 independently from the first AOBD 42.

At least a portion of the AOBD device bandwidth corresponds with a transmitting range of deflection frequencies, where the laser beam is deflected to a target at the substrate in the processing field of view. At other frequencies outside of the transmitting range or at alternate diffraction orders, the beam may be deflected to a beam stop, dump, blocker, or other non-transmitting element. Frequencies outside the transmitting range may include a portion of the device bandwidth and may include frequencies outside the device bandwidth, for example high frequencies that are greater than the sum of the center frequency plus half of the bandwidth. Alternate diffraction orders may be for example $2^{nd}$ and higher orders when the device is designed to operate in the first diffraction order. Typically, the beam is deflected in the first diffraction order and the remaining zero order beam energy is blocked with a beam pick-off or beam dump.

FIG. 6, for example, shows diagrammatically, an AOBD device 120. When no RF signal is applied, there is no beam deflection, and the beam 122 is output along the zero order direction 124. When an RF signal in a transmitting frequency range of for example, 72.50 MHz to 107.5 MHz is applied to the device 120, the beam 122 is deflected at a corresponding transmitting angle, e.g., to 116.8 milliradians (as shown at 126), to 145 milliradians (as shown at 128), and to 173.2 milliradians (as shown at 130). When the RF signal is non-transmitting, for example at 140 MHz frequency, the beam 122 is deflected at a corresponding non-transmitting angle for example 225.5 milliradians as shown at 132. The beam deflections, for example shown at 126, 128 and 130 may be used for processing a target, while the zero order direction beam (shown at 124) and the beam deflection shown at 132 may be blocked.

A field size as shown at 140 in FIG. 7A, may be characterized as having a width x and a length y such that the field size may be represented as a function of x and y. A beam may be have a two-dimensional deflection within the field as illustrated at 142 in FIG. 7B wherein the beam is deflected from a first position 144 to a second position 146. As shown at 148 in FIG. 7C, when the beam is expanded and spot size is reduced, the deflection angle is reduced and the field size is reduced. The number of focused spots that can be addressed in the range of the deflector over the field will be constant regardless of the beam expander setting. So, there is a direct trade-off between spot size and field size with small spots over a small field and larger spot over a larger field. In conjunction with the processing lens, methods according to U.S. Pat. No. 7,402,774 (the disclosure of which is hereby incorporated by reference) can be used to provide a range of field sizes and spot sizes without degradation of the spot over the field.

Figure 8A:
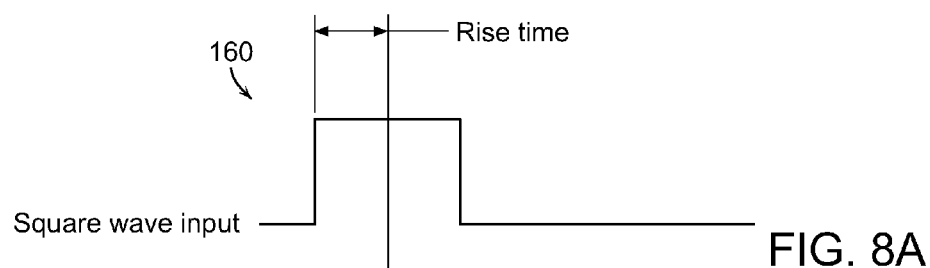
FIGS. 8A-8C show illustrative diagrammatic views of an input signal and an RF and Acoustic response to the input signal in a system in accordance with certain embodiments of the invention.
Figure 8B:
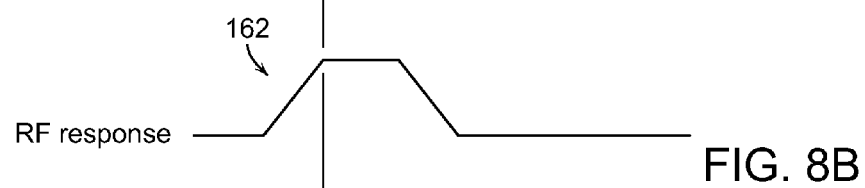
Figure 8C:
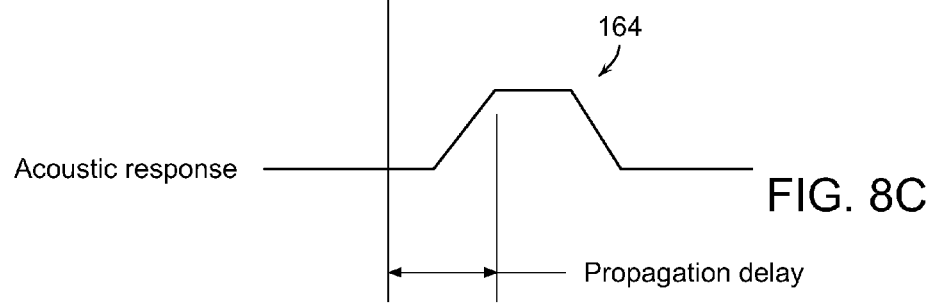

An aspect of AOBD optimization is the speed at which different position commands can be realized in a deflector according to the RF frequency applied to the AO crystal. FIGS. 8A-8C show signal envelope shapes of an applied command signal (shown at 160), an RF response (shown at 162) and an acoustic response (shown at 164). The design of the AO crystal, the transducer geometry and the active acoustic window area generated will take into account many factors, such as efficiency, range of deflection, and inter-modulation. Any type of suitable crystal/transducer geometry may be selected and used in an AOBD device. Preferably, a $TEO_2$ crystal is used, although other types of acousto-optic material, especially those developed for use in acousto-optic beam deflectors, may be used. Each device type, depending on the materials and construction geometry, as well as the geometry of the beam filling the acoustic window, will have a characteristic time it will take to setup deflection as the acoustic wave traverses the cell. Optimization may include measuring deflection efficiency versus time following a commanded deflection angle, determining the minimum lead time required to reach a desired efficiency at the deflection angle, and based on the time required to reach the desired efficiency, timing a laser firing sequence to fire a laser pulse at a minimum lead time to optimize a laser processing sequence. This optimization may take into account a different set of initial conditions, for example, the deflection state of the AOBD immediately prior to set up of a new deflection angle. Likewise, other AOBD performance characteristics may be analyzed and optimized to ensure a desired level of performance in a minimum set-up time.

Another related aspect of AOBD optimization in random access positioning, is the duration of an applied RF deflection signal. Durations of the applied RF, using the optimized lead time, may be varied while deflection efficiency or other parameters are measured. In this way a minimum RF deflection period may be determined for any particular AOBD device. The minimum RF period in conjunction with the minimum lead time may be used to further optimize a laser processing sequence.

Compensation for variations of AOBD efficiency (AOBD efficiency is the ratio of pulse energy exiting the AOBD to the pulse energy entering the AOBD) by adjusting RF input power levels with field position is a well-known technique. Theoretical models can be used to predict efficiency performance versus angle and generate correction values; however each AOBD can have varying efficiency characteristics. As a result, efficiency characteristics, as shown at 166 in FIG. 9A for absolute efficiency and as shown at 168 in FIG. 9B for relative efficiency are preferably determined by direct measurement of the deflected optical power. For correction, RF power can then be modulated according to the measured efficiency versus angle to maintain a uniform optical output across the deflection range.

AOBD efficiency versus angle however, also depends on the RF power level, so simple efficiency measurement at a static RF power level may be inadequate to accommodate this non-linear efficiency characteristic. A more sophisticated correction scheme is therefore needed. Dynamic measurements may be made by adjusting the RF level to match measured values to an efficiency target value over a range of selected deflection angles to generate an RF power versus deflection angle correction function for the efficiency target value. Alternatively, iterative measurements can be made across the deflection range for a nominal efficiency target value, starting with an initial RF correction function, determining residual efficiency errors versus angle based on efficiency measurements in subsequent steps, and generating an improved RF correction function using the residual error values. Other procedures may be used to accurately calibrate efficiency versus field angle such as generating an efficiency look-up table over the desired deflection and efficiency range. However, techniques that minimize data management overhead, such as determining sets of characteristic curves are preferred, especially when considering complexities of 2 axis deflection described below.

Figure 9A:
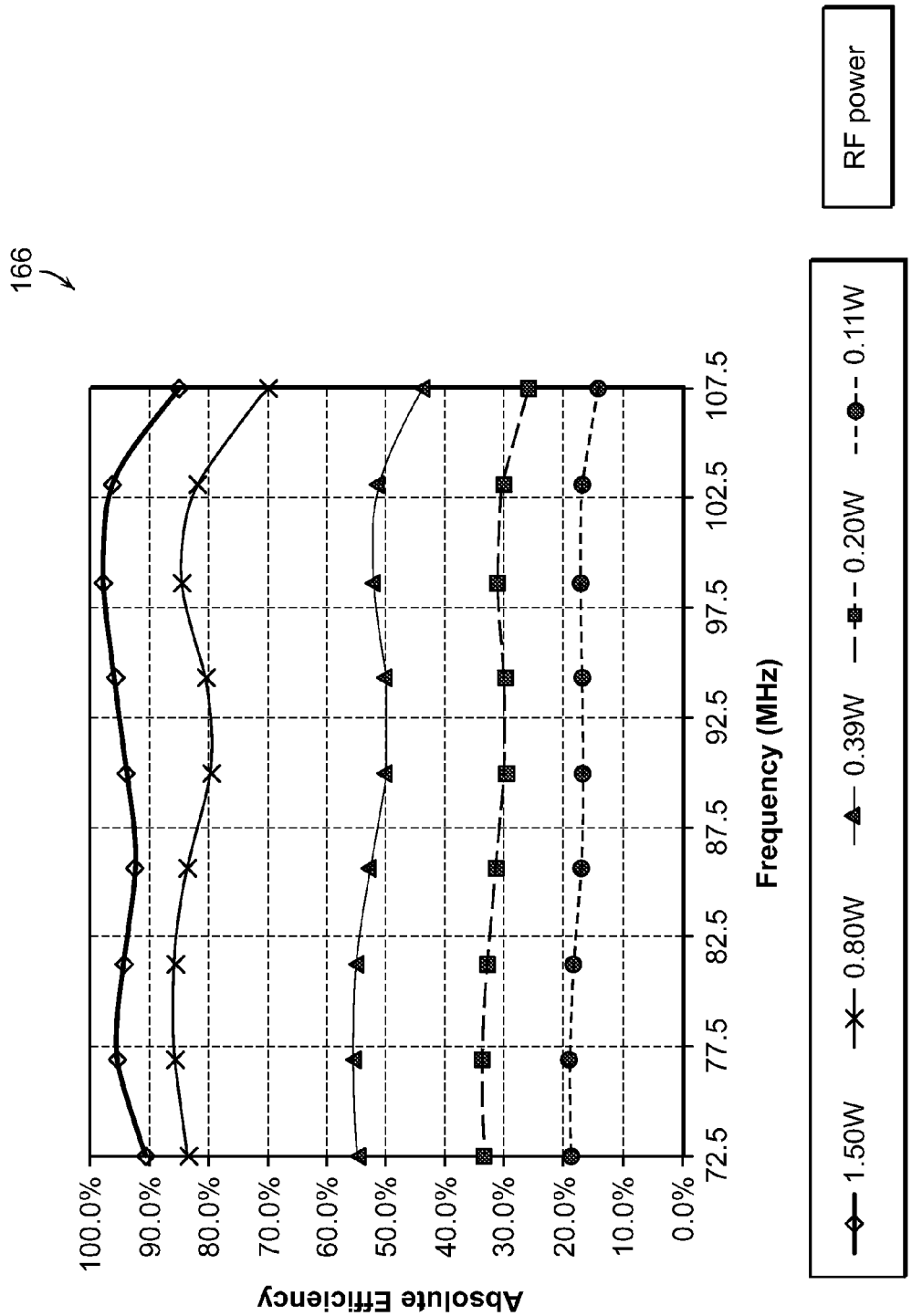

Modulating the RF power in an AOBD can be used to control optical attenuation. Since the efficiency curves change for different attenuations as shown in FIGS. 9A and 9B however, a set corrections curves is needed for different efficiency target values, each target value corresponding to a desired optical attenuation. These correction curves may be determined from direct measurements as discussed, they may be constructed from a characteristic data set or table, or the may be at least partially generated by interpolating values from 2 or more correction curves. These sets of curves represent in effect, surfaces of RF power values required to calibrate an AOBD over the dimensions of deflection angle and attenuation level.

Figure 10:
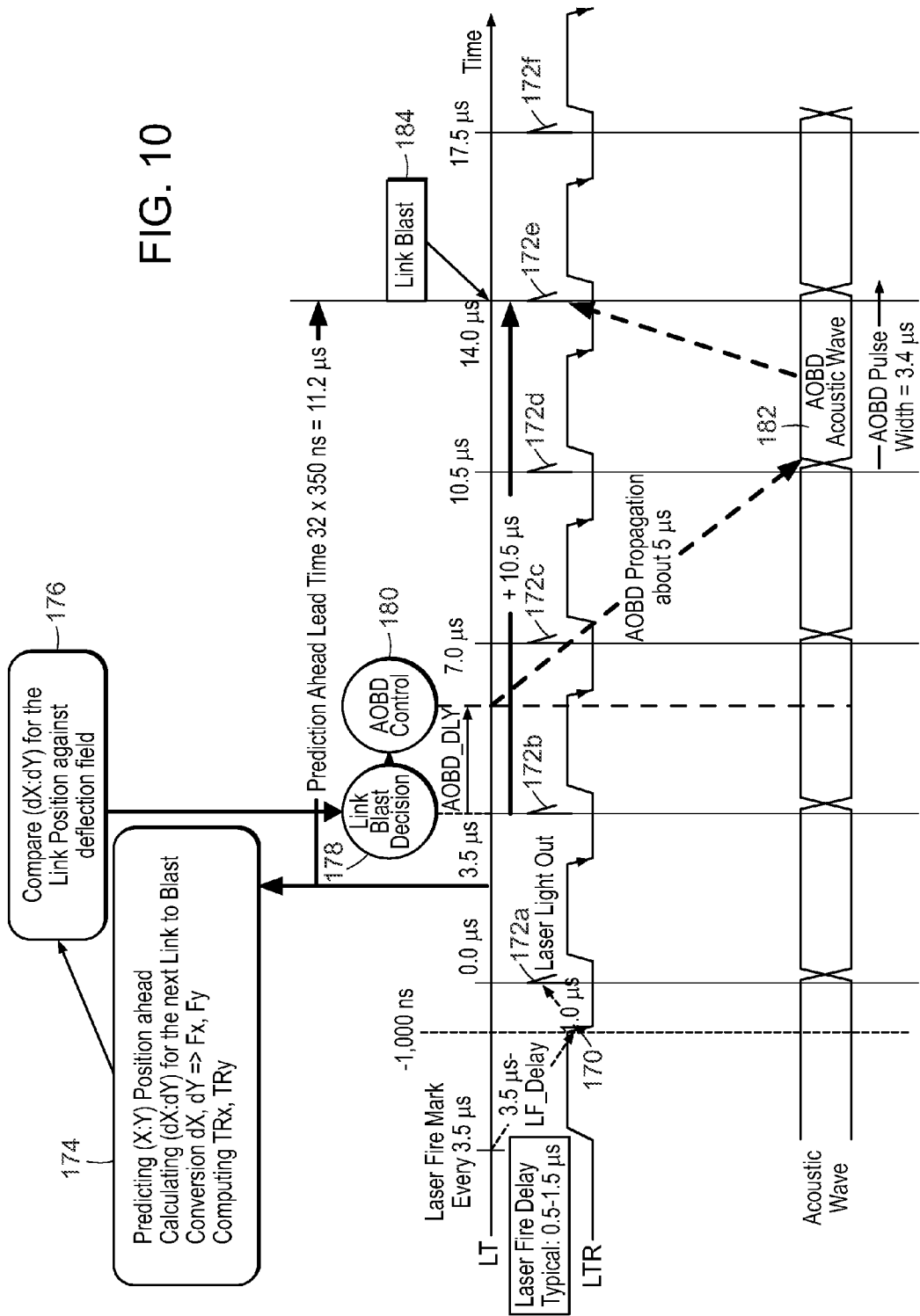
FIG. 10 shows an illustrative diagrammatic view of a timing of a predictive processing method used in accordance with certain embodiments of the invention.

FIG. 10 illustrates a timing diagram of a predictive laser processing system. As shown in FIG. 10, a laser may be fired every 3.5 μs as indicated by laser time line LT. This timing corresponds approximately to a 300 KHz laser. A laser pulse is triggered by a triggering waveform as represented by waveform LTR. The laser trigger may occur on the falling edge of a square wave as represented by arrow 170. A delay may exist in processing the laser trigger signal to fire the laser pulse. The generation of the laser pulse is represented as 172a-172f in FIG. 10. As shown, a delay may be represented as a 1.0 μs delay between the square wave trigger pulse 170 and the firing of the laser pulse at 172a, but is not limited thereto. FIG. 10 shows the process for predictive blasting of a link with laser pulse 172e. As also shown in FIG. 10, the deflection parameters for this pulse are computed and the process of deflection initiation is begun (174) about three laser pulse periods prior to laser pulse 172e.

Figure 11:
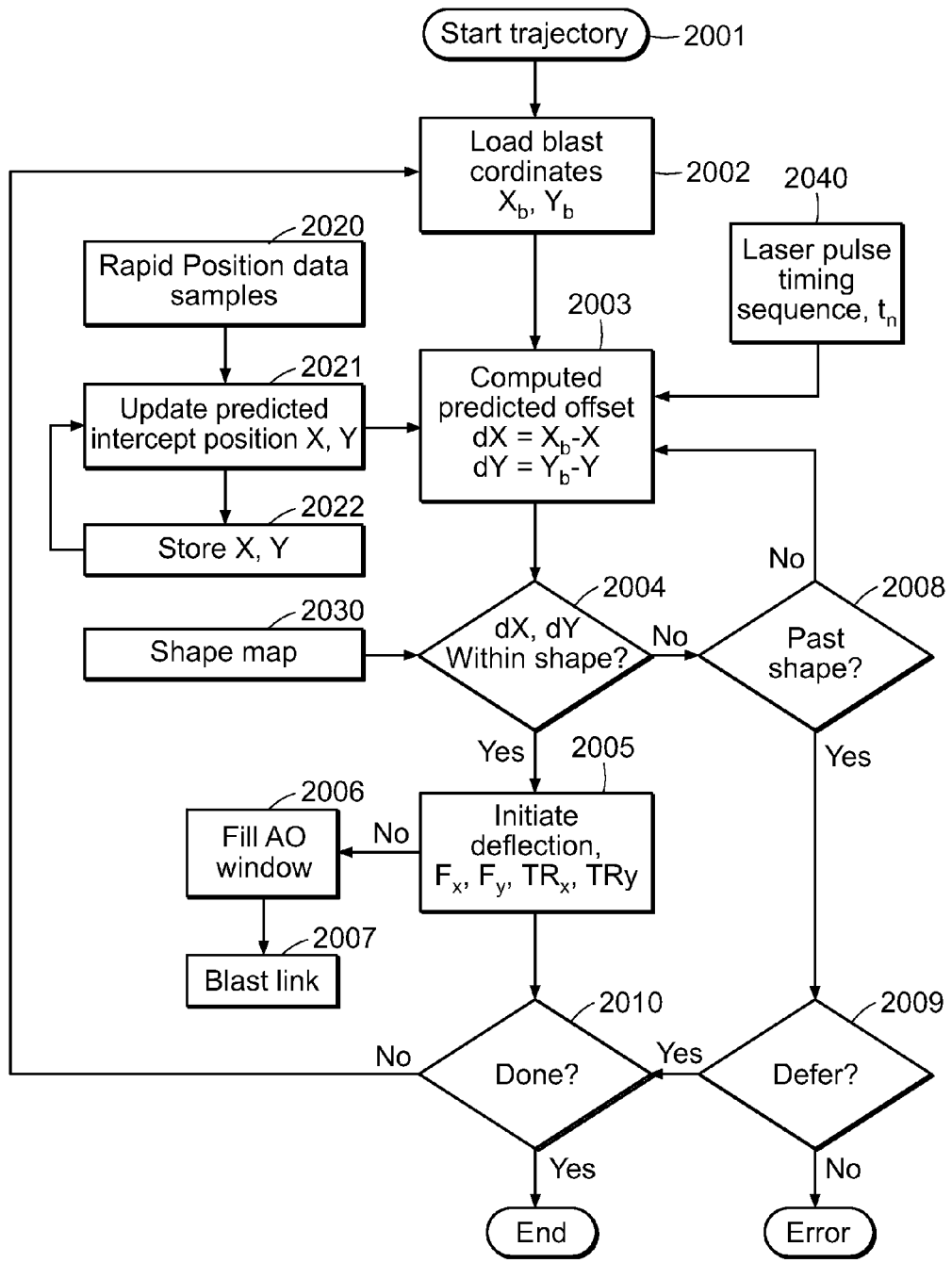
FIG. 11 shows an illustrative diagrammatic flowchart of a predictive processing method of a system in accordance with certain embodiments of the invention.

In accordance with certain embodiments therefore, a method of predictive processing may be used with reference to FIG. 11. See previously incorporated by reference U.S. Patent Application Publication No. 2011/0210105, and in particular FIG. 20 and the accompanying paragraphs including ¶0176, ¶0177, ¶0178 and ¶0179 thereof.

Efficiency for beam transmission may be determined as represented by TRx and TRy to determine the appropriate RF energy to apply to the AOBD at the selected frequencies. Look-up tables or formulas may be used in order to determine RF frequency values and amplitudes corresponding to the amount of deflection desired and the desired pulse energy for blasting a link.

As represented at 176, the predictive processing sequence may include a comparison of the offset position (dX:dY) with a deflection field. As represented at 178, the system may determine whether a link blast should be executed with this pulse based on the comparison of (dX:dY) with the deflection field. If the offset position lies outside of the deflection field for links under consideration for blasting, the system may determine that the laser pulse should not be used for link blasting. For example, the laser pulse may be left un-deflected and picked-off, attenuated or deflected to a dump position where no processing of links occurs. If the position is within the deflection field, the sequence may continue as represented at 180 to initiate AOBD control for laser pulse 172e. As shown in FIG. 10, an AOBD delay (AOBD_DLY) may exist for generating a required electrical RF output from the power supply. This delay may result in part from the time required to compute the desired frequency and amplitude of the electrical driving signal and generating the RF drive signal from a power supply for driving the transducer. This delay may for example, be about a 2 μs delay. Following this delay time, an AOBD acoustic wave is generated at 182.

The AOBD acoustic wave may require a predetermined amount of time to enter the AOBD deflection window. For example, this time is represented as a 5 μs propagation time to begin entering the AOBD deflection window. Once the acoustic wave is fully present in the acoustic window, the link is severed at 184 with laser pulse 172e.

Within each AOBD, there is a characteristic acoustic delay time for the RF generated acoustic wave to propagate through the acoustic crystal to fill the acoustic aperture used for beam deflection. So, the laser spot offset from the intercept point and the associated RF frequency and RF amplitude must be determined in advance of the laser pulse, which may be on the order of 10 microseconds. The delay depends on the acoustic crystal material properties (acoustic velocity) and the AOBD crystal geometry. When high repetition lasers are used such as lasers pulsed at greater than 100 KHz, the pulse repetition period may be less than the acoustic delay time. In one implementation of the invention, rapid sequential pulse transmission can be accommodated by stacking RF pulses in the AO crystal. For example, at about 300 KHz, three RF pulses may simultaneously propagate in the AO crystal and the RF generation may be several pulses ahead of the laser pulse. The amount of time required for an acoustic wave to enter the AOBD window may be, for example, be represented as a 5 μs propagation time. Once the acoustic wave is fully present in the acoustic window, the link may be severed with a laser pulse.

Figure 12A:
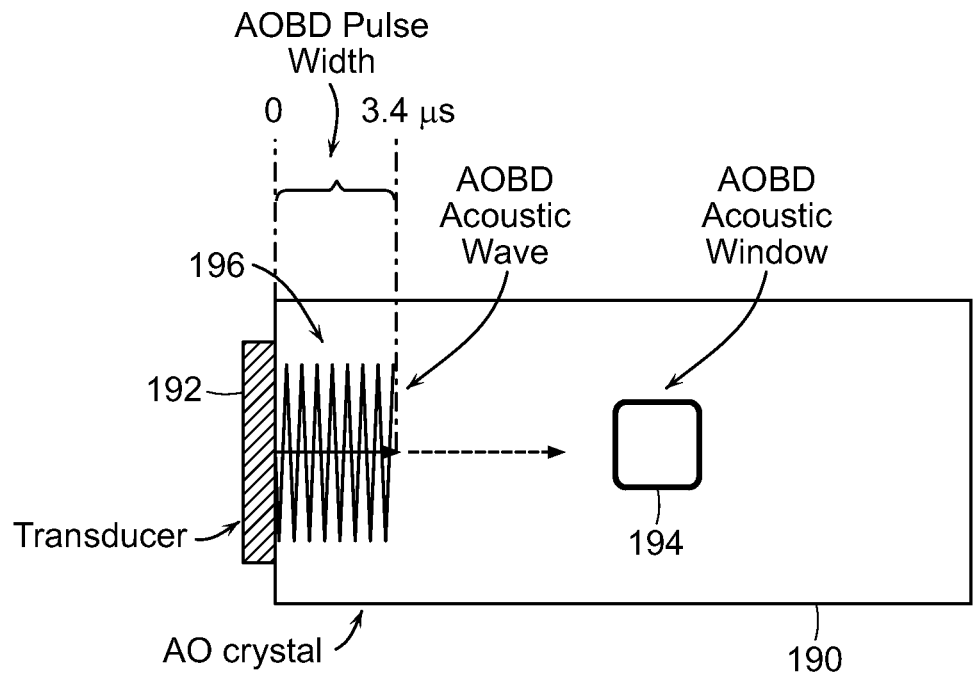
FIGS. 12A and 12B show illustrative diagrammatic views of pulse propagation within an AOBD in accordance with certain embodiments of the invention.
Figure 12B:
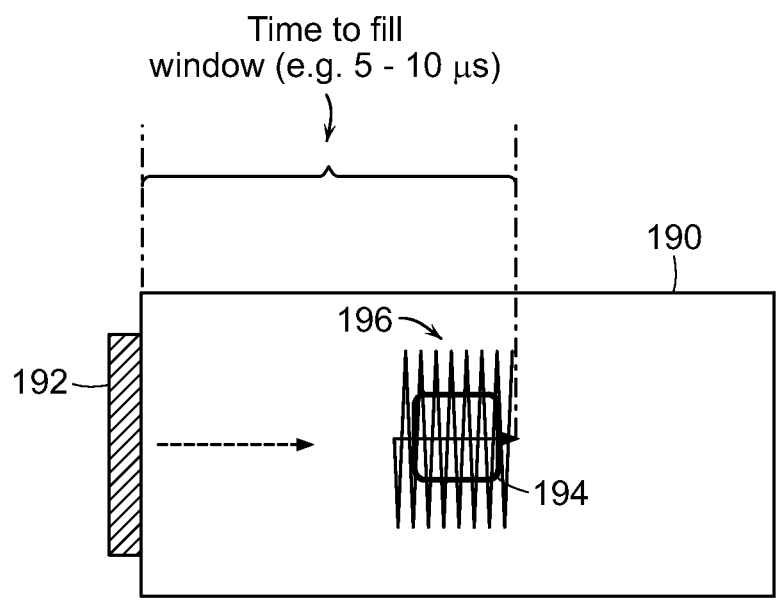

Each RF pulse is therefore characterized by a start time and end time with a pulse period duration extending from the pulse start time to the pulse end time. For example, FIG. 121A shows an AOBD device 190 having a transducer 192 coupled to the device on one side. The device 190 also has an acoustic window 194 through which a beam passes. An acoustic wave 196 is shown propagating from the RF transducer, and has spatial width that is defined by the RF start time and end time. As shown in FIG. 12B, the acoustic wave 196 travels through the device 190, and crosses the laser path within the window 194. As shown, the time required for the acoustic wave to fill the window may be, for example, about 5 μs to 10 μs.

Figure 13:
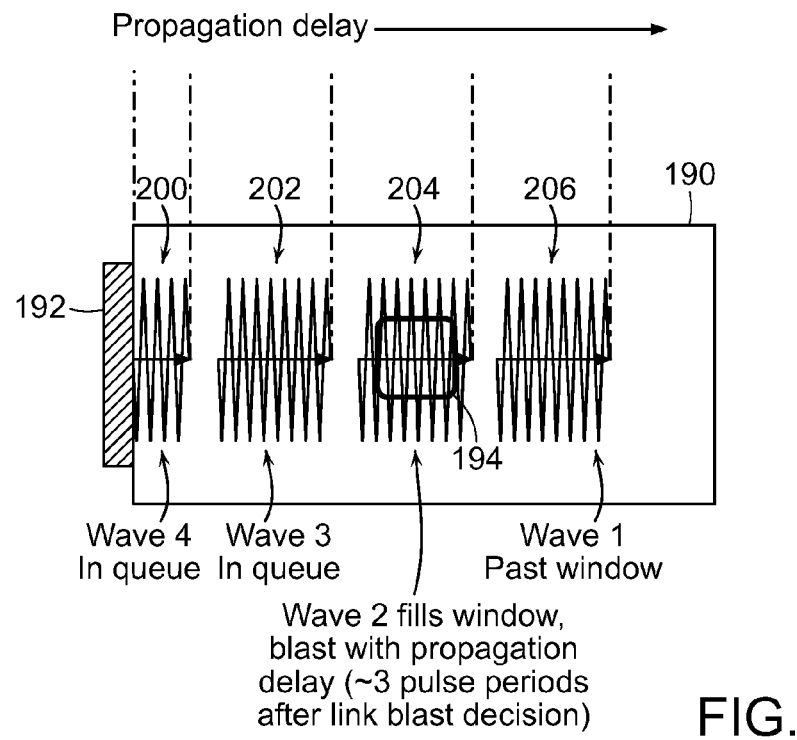
FIG. 13 shows an illustrative diagrammatic view of a pulse stacking process in an AOBD in accordance with certain embodiments of the invention.

Due to this characteristic propagation delay of the device, acoustic wave may be stacked such that multiple acoustic waves may be propagating through the device at the same time. FIG. 13, for example shows multiple acoustic waves 200, 202, 204, 206 traveling through the device 190. Acoustic wave 204 is shown filling the window 194, while acoustic wave 206 has traveled through the window 194.

RF pulses are usually generated at a repetition rate corresponding to the laser processing output repetition rate, for example 100 kHz to 300 kHz. Each RF pulse is generated in advance of the corresponding laser pulse to compensate for the acoustic wave propagation delay. In this way, the RF pulse timing is synchronized with the laser processing output repetition rate such that the acoustic window is filled at the time a laser pulse or laser pulse group is to be transmitted.

The application of RF power to the AOBD transducer and transmission of acoustic energy in acoustic medium can result in heating of the bulk material. Heating will raise the temperature of the bulk material and generate thermal gradients within the bulk material. This heating varies with the RF power applied and can result in changes to the deflection angle (beam wander) as well as changes in transmission of the deflected beam (efficiency wander). Other energy sources may also heat the AOBD, for example high optical absorption of laser energy can cause local heating. Heating beyond operational tolerances and high peak power optical irradiation may have additional undesirable effects such as material damage, coating damage, and material degradation such as gray track damage.

Thermally stable acousto-optic devices may be used in at least one embodiment of the invention to reduce beam pointing instability or to reduce optical aberrations. A thermally stabilized acousto-optic device may be used for pulse picking from a continuous pulse sequence or for beam positioning. The stabilized acousto-optic device is driven by one or more transducers at one or more frequencies with RF power. The first-order diffracted beam is deflected to a laser processing path as is well-known in the art. The frequency of the RF may be varied dynamically to position a deflected laser spot to a precise workpiece location. The amplitude of the RF may be varied to change the diffraction efficiency of the acousto-optic device and modulate the beam energy. During pulsed processing and between processing pulses the acousto-optic cell receives RF power and a near constant thermal load. RF frequency is interrupted in coincidence with the non-processing pulse to allow a single non-processing pulse to pass into a different order beam to a beam dump or into a deflected beam dump. Therefore, the duty cycle of the RF is typically high and thermal instability due to an intermittent RF load is reduced. RF power may be modulated between laser pulses to control thermal loading to the acousto-optic cell, for example to maintain a constant average thermal load.

In some conventional precision pulsed laser processing systems, RF is applied in relatively short pulses on the order of 10 microseconds or less. This sets up the acoustic wave in the acoustic window for high diffraction efficiency only when the laser is pulsed, which minimizes the RF duty cycle thus limiting heating in the AOBD. For a given set RF amplitude level, as the laser repetition rate is increased, more RF pulses are applied to the AOBD. As a result, heating is increased up to a maximum when the RF pulses comprise the full AOBD duty cycle at the maximum RF pulse repetition rate.

This maximum AOBD repetition rate limits the maximum laser processing rate accordingly even though a given laser may be able to operate independently at higher repetition rates. Considering field position and processing pulse energy, maximum overall heating will occur at the maximum repetition rate and highest RF power, for example, with maximum transmission at RF frequencies where efficiency is the lowest (e.g., at field edges).

Figure 14:
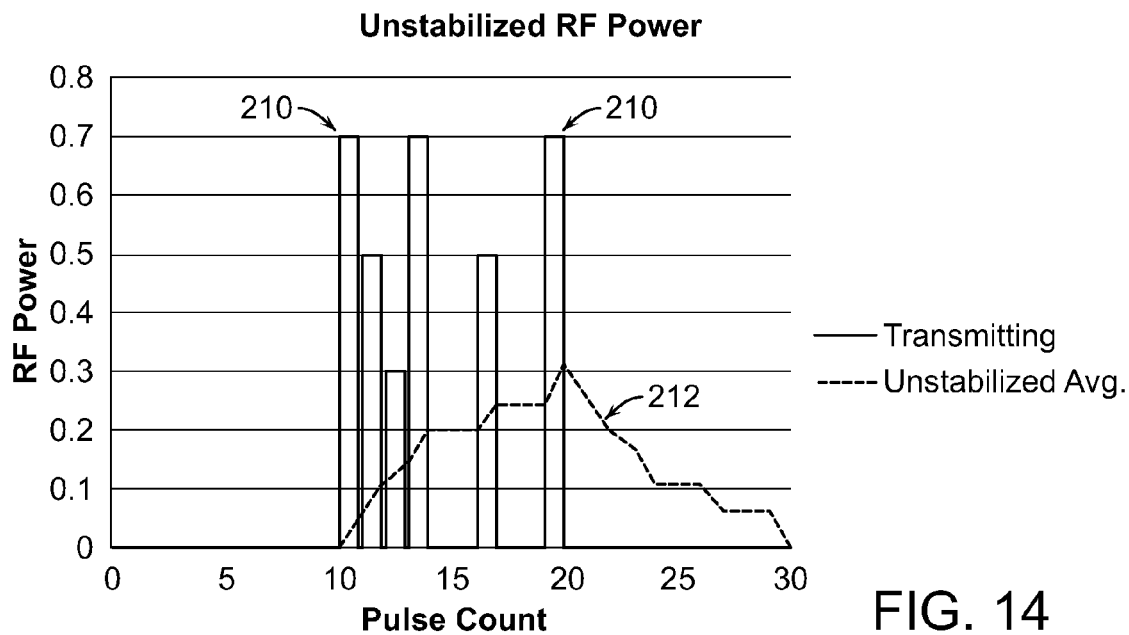
FIG. 14 shows an illustrative graphical representation of RF power in a system employing no RF power stabilization.

Continuous and iterative processing sequences may effectively provide regular and uniform time-averaged heating of an AOBD device, for example with continuous raster scanning. FIG. 14 shows at 210, transmitting RF pulses of a demonstrative example. Due to the intermittent nature of the transmitting laser processing pulses 210, the average RF power is unstabilized as shown at 212. The intermittent application of laser processing pulses to targets controlled by AOBD modulation can result in an intermittent thermal load. Moreover for irregular placement of processing targets with corresponding variable deflection angles, and RF amplitude (for laser modulation) may vary further contribute to irregular thermal loading. This unbalanced thermal loading can result in unstable AOBD device temperatures. As shown, different amplitudes are applied at intermittent times and the average load rises during RF pulsing and then subsides, representative of an increase and decrease in AOBD temperature. Among other effects, it has been observed that unstable device temperature can cause instability in delivered optical energy relative to commanded energy values Conventional cooling of AOBD devices is primarily passive conductive cooling. For certain types of devices designed for high optical power or requiring high RF power, active liquid cooling may be used. For example germanium devices may be liquid cooled to prevent thermal runaway. In many micromachining applications however, passive cooling is sufficient to maintain AOBD devices within operational tolerances. Cooling requirement and thermal stability can be influence by local thermal management, for example within a subsystem enclosure such as a laser beam path enclosure box. At the next level system enclosures and system thermal management may affect AOBD operation, and finally room or factory ambient conditions may affect operating set points for example.

Figure 15:
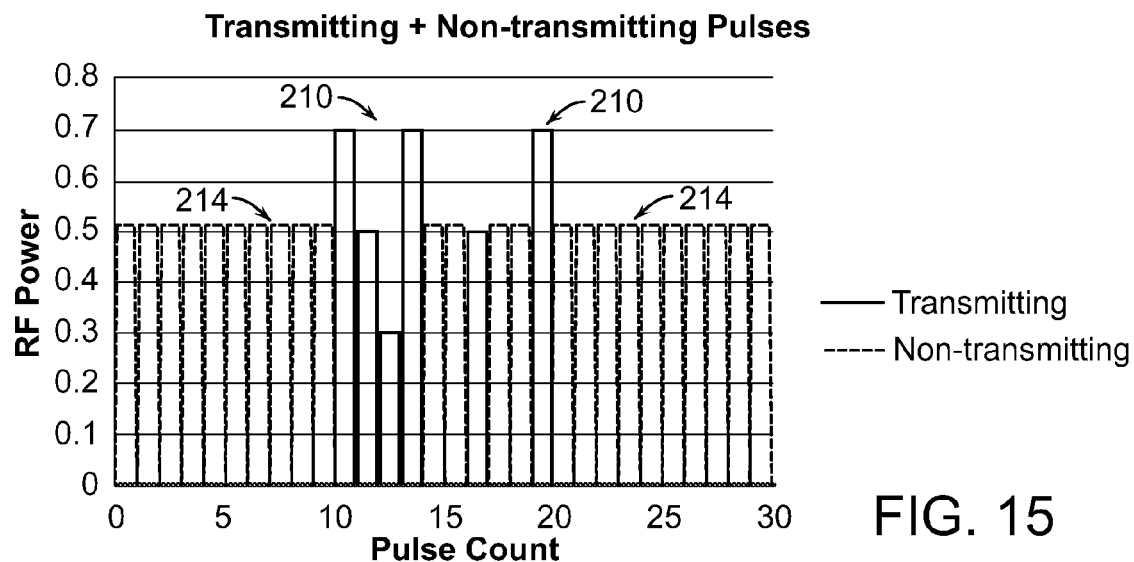
FIG. 15 shows an illustrative graphical representation of RF power using transmitting and non-transmitting pulses in accordance with certain embodiments of the invention.
Figure 16:
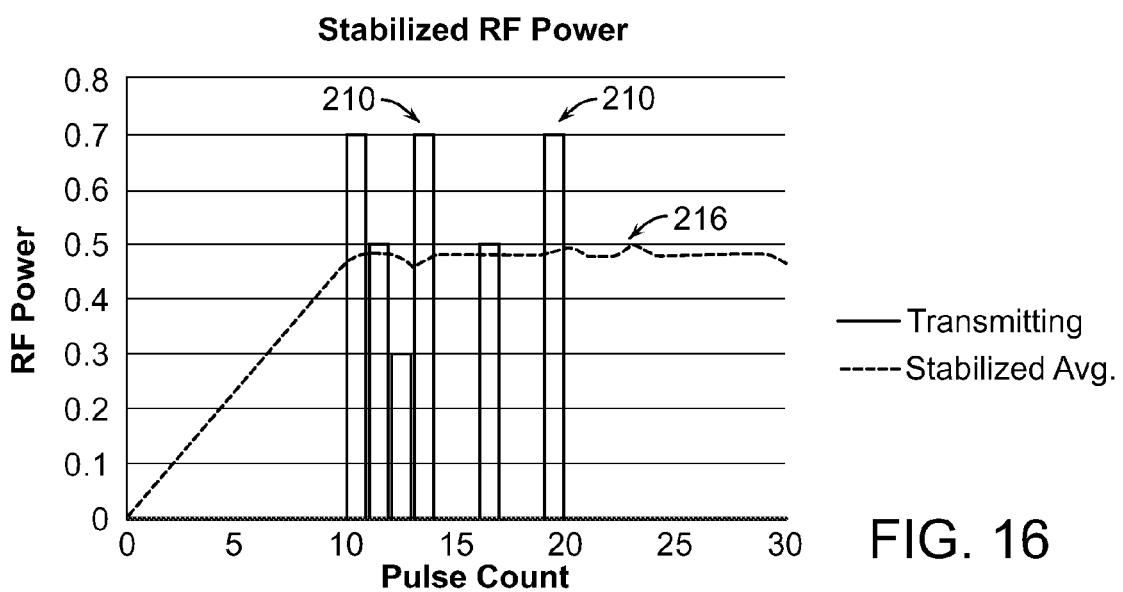
FIG. 16 shows an illustrative graphical representation of RF power in a system employing power stabilization in accordance with certain embodiments of the invention.

For certain laser processing applications with narrow laser pulse energy processing windows, for example laser-based memory repair systems, delivered laser pulse energy may be precisely controlled. FIG. 15 shows the intermittent transmitting RF pulses 210 of FIG. 12, together with non-transmitting pulses 214. In accordance with an embodiment of the invention therefore, non-transmitting pulses 214 are employed for laser pulses that are not intended to be used for laser processing. The non-transmitting pulses 214 have an amplitude and/or frequency that causes the AOBD or AOM device to direct the beam along a path other than the laser processing optical path (e.g. toward a beam stop). As shown in FIG. 16, the effect of this is to stabilize the RF power in the acousto-optic device. In particular, FIG. 16 shows the intermittent pulses 210 as well as the average RF power (shown at 216), which is now stabilized.

Figure 17:
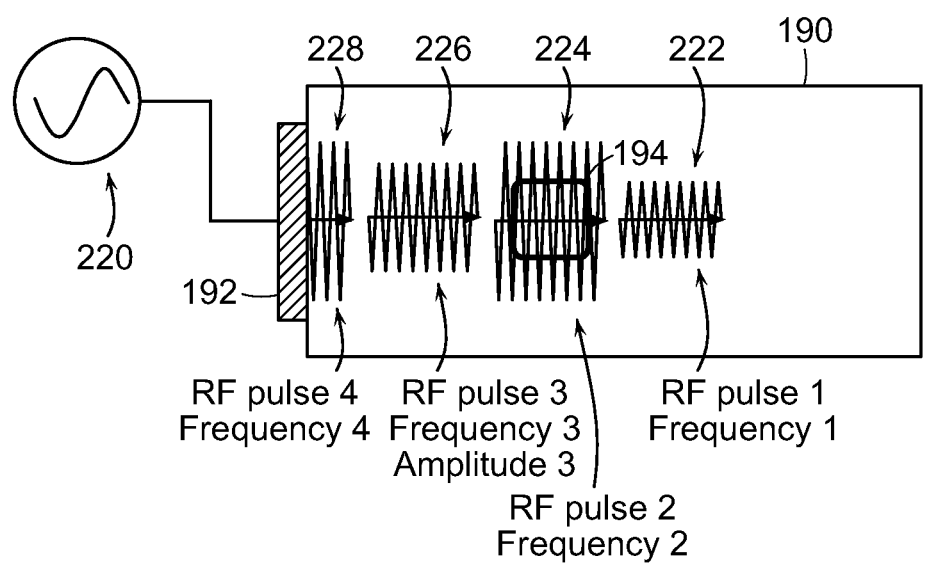
FIG. 17 shows an illustrative diagrammatic view of a dynamic pulse stacking process in an AOBD in accordance with certain embodiments of the invention.

FIG. 17 diagrammatically again shows the acousto-optic device 190 and attached transducer 192 discussed above. The transducer 192 is driven by a control system (generally shown at 220) to provide a modulated RF drive signal for propagating a sequence of acoustic waves. In particular, a first acoustic wave 222 may have a first frequency and amplitude, while a second acoustic wave 224 may have a second different frequency and amplitude. A third acoustic wave 226 has a third frequency and amplitude and a fourth acoustic wave 228 may have yet a further different frequency and amplitude. Generally, the amplitude and/or frequency of the acoustic waves may be set to transmit laser pulses to predetermined target locations with predetermined laser pulse energy and may be dynamically adjusted when laser pulse energy is not transmitted to provide very stable average acoustic power in the device, which provides temperature stabilization. Acoustic wave 224 is shown as being within the acoustic window 194, while acoustic wave 222 has already passed through the acoustic window 194.

Figure 18:
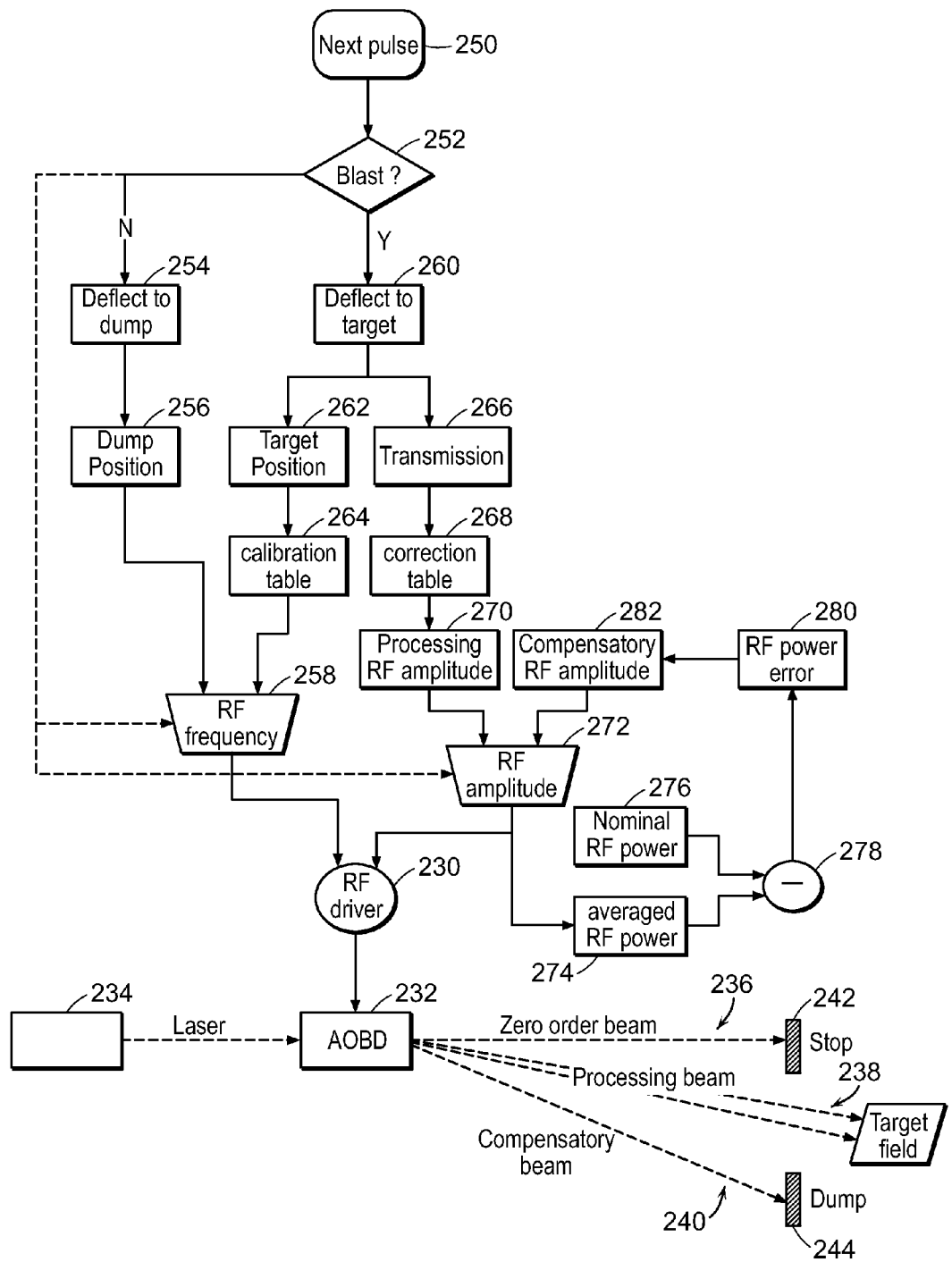
FIG. 18 shows an illustrative diagrammatic flowchart of pulse processing in a system in accordance with certain embodiments of the invention.

FIG. 18 shows a diagrammatic flowchart of a system for controlling the operation of an RF driver 230 that drives an AOBD device 322 that selectively directs pulses from a laser 234 along any of a non-transmitting zero-order path (shown at 236), one or more beam processing paths (shown generally at 238) or one or more non-transmitting compensatory paths (shown at 240). The non-processing non-transmitting paths direct the beam toward stops/beam dumps 242, 244 as shown. The control system stabilizes the acousto-optic device temperature and maintains precise energy delivery.

Generally, in accordance with certain embodiments of the invention, techniques are employed for minimizing thermally induced energy wander and beam wander in AOBD devices, especially when intermittent laser pulses are selected from a stable, constantly pulsed laser source for processing. These techniques use various forms of balanced thermal loading with control of applied RF energy. The techniques include applying RF pulses at a substantially constant rate to uniformly load the acousto-optic cell with constant average power while changing RF pulse parameters to provide pulse selection and thermal load balancing. RF pulses may be generated for deflections coinciding with laser pulses at non-transmitting frequencies that either have essentially zero efficiency in the deflection field, or that deflect the beam outside of the deflection field. In these cases, the RF pulse energy contributes to a constant thermal load but does not contribute to the acousto-optic transmission. This allows thermal stabilization pulse by pulse and at the same time allows independent control of the AO transmission for laser processing.

In particular, the control system may function as follows. For each laser pulse (shown at 250), the system first determines whether the pulse is to be used for laser processing or dumped to a stop (shown at 252). If the laser pulse is not to be used for laser processing (no blast determination), then the pulse will be deflected to a beam dump (shown at 254). The corresponding non-transmitting RF frequency of the dump position (shown at 256) is provided as input to an RF frequency multiplexer (shown at 258), which communicates with the RF driver 230. The RF frequency multiplexer selects the non-transmitting frequency for output based on the no blast determination.

If the laser pulse is to be used for laser processing (blast determination, shown at 252), the laser pulse will be deflected toward the target (shown at 260). The commanded target position of the laser spot (shown at 262), is converted to a calibrated transmitting RF frequency with a calibration table (shown at 264) to provide further data input to the RF frequency multiplexer (shown at 258) which is in communication with the RF driver (shown at 230). The RF frequency multiplexer selects the transmitting frequency for output based on the (yes) blast determination. The commanded pulse transmission (shown at 266) is corrected by referencing a correction table (shown at 268) to determine the corresponding processing RF amplitude (shown at 270). This transmitting processing RF amplitude is provided as input to an RF amplitude multiplexer (shown at 272), which is also in communication with the RF driver (shown at 230). The RF amplitude multiplexer selects the transmitting RF amplitude for output based on the (yes) blast determination. A feedback loop is also provided wherein the output of the RF amplitude multiplexer (shown at 272) is also provided to a routine for determining the averaged RF power (shown at 274).

A nominal RF power (shown at 276) is subtracted from the averaged RF power (shown at 278). This difference is then provided as an RF power error signal (shown at 280), to a compensatory RF amplitude routine (shown at 282). The compensatory RF amplitude routine provides a compensatory RF amplitude signal as input to the RF amplitude multiplexer (shown at 272). The RF amplitude multiplexer selects the non-transmitting compensatory amplitude for output based on the no blast determination. The controller may, for example, be a field-programmable gate array (FPGA) circuit or integrated circuit chip.

The compensatory RF pulse energy is therefore based on a predicted average thermal load that is derived from a set of commanded RF pulse amplitudes over a predetermined time interval that is less than the thermal time constant of the AO device. The average RF power in each deflector may be determined based on measurement, but preferably is accurately estimated based on digitally processed commanded pulse energies and associated transmission values for each AOBD. Since precise energy control is required for memory repair, in this laser processing application at least, the predicted applied RF power for each pulse may be based on correction tables for field position or other parameters for improved accuracy without real time measurement. Thus, average RF power applied may be predicted from the commanded transmissions and the RF corrections needed to achieve the desired transmission at give nominal transmissions and deflection angles.

The RF frequency therefore controls the beam deflection angle and the RF amplitude is used to control the optical transmission. RF frequency calibration tables may be used to deflect the beam with a frequency that corresponds to precise locations at the work piece. RF amplitude correction tables may be used to compensate for variations in transmission with the applied frequency and transmission level to provide precise commanded pulse energies. These corrections compensate for well-known diffraction efficiency variations with deflection angle, and in particular when the AOBD is used for energy control, corrections compensate for non-linear transmission with the RF power level.

With corrected RF amplitude over a range of RF frequencies, RF power applied to the device varies to achieve commanded pulse energy for different RF frequencies. As a result, RF thermal loading varies over the deflection field. For example, with commanded constant pulse energy over a deflection field, the applied RF power to achieve the desired transmission would vary inversely with the AO diffraction efficiency at the deflected angle. For a typical deflector, efficiency would be low at the edges of the field so more RF power would be used increasing thermal loading when processing at the edge of the field. With transmission corrected to be constant over a deflection field range, maximum transmission will be limited by the lowest transmission within the deflection field. Generally, wider deflection fields correspond to lower transmissions and higher thermal loading.

When laser pulse energies settings are controlled using thermally sensitive AOBD devices, RF pulse amplitude will vary to modulate the transmitted laser pulse energy, complicating the thermal load balancing scheme. Some options to balance variable RF amplitudes include RF pulse width modulation by increasing the transmitting pulse width as the amplitude decreases to maintain constant RF pulse energy in the transmitting RF pulse.

Since the compensatory RF pulse is non-transmitting, shorter RF pulses may be used that would otherwise be too short for a transmitting RF pulse since the associated non-transmitting acoustic waves are not required to completely fill the acoustic window. In this case, a portion of the non-transmitting laser pulse may propagate in the zero order and another portion may be deflected by the non-transmitting frequency. With RF pulse width modulation, a compensatory RF pulse width is set proportional to the average RF power set level to maintain the average RF power. When estimated average RF power falls below the set point, the RF pulse width is changed and full RF pulse width used. Conversely, when average RF power falls above the set point, the RF pulse width is changed and zero RF pulse width is used. In this way, fast convergence to the average RF power is achieved. Optionally, intermediate RF pulse widths may be used between a nominal RF pulse width and the full RF pulse width as well as between zero and the nominal RF pulse width.

For high processing throughput with attendant high laser pulse repetition rates however, the RF signal may be applied to the AO cell at a nearly 100% duty cycle. This makes the delayed (i.e. non-impingement interval) RF pulsing scheme impractical since a delayed (or advanced) RF pulse could occur in the acoustic window at the time of an adjacent laser pulse. Similarly, RF pulse width modulation is impractical for RF transmitting frequencies since shortening the RF pulse width would result in a partially filled acoustic window. Thus, these thermal stabilization techniques may not provide adequate thermal balancing capability in high rate single channel processing systems in certain applications.

The combined RF loading of transmitting and non-transmitting RF pulses provides a stable compensated thermal loading. The non-transmitting frequency deflects a portion of the beam to a beam dump and preferably the non-transmitting frequency is higher than the deflection frequency range to minimize any residual effects of ultrasonic harmonics within the AOBD for, example more than twice the lowest transmitting frequency. Depending on the compensatory RF pulse power and diffraction efficiency at the non-transmitting frequency, laser pulse energy that is not to be deflected will be picked off by the zero order beam stop.

Figure 19:
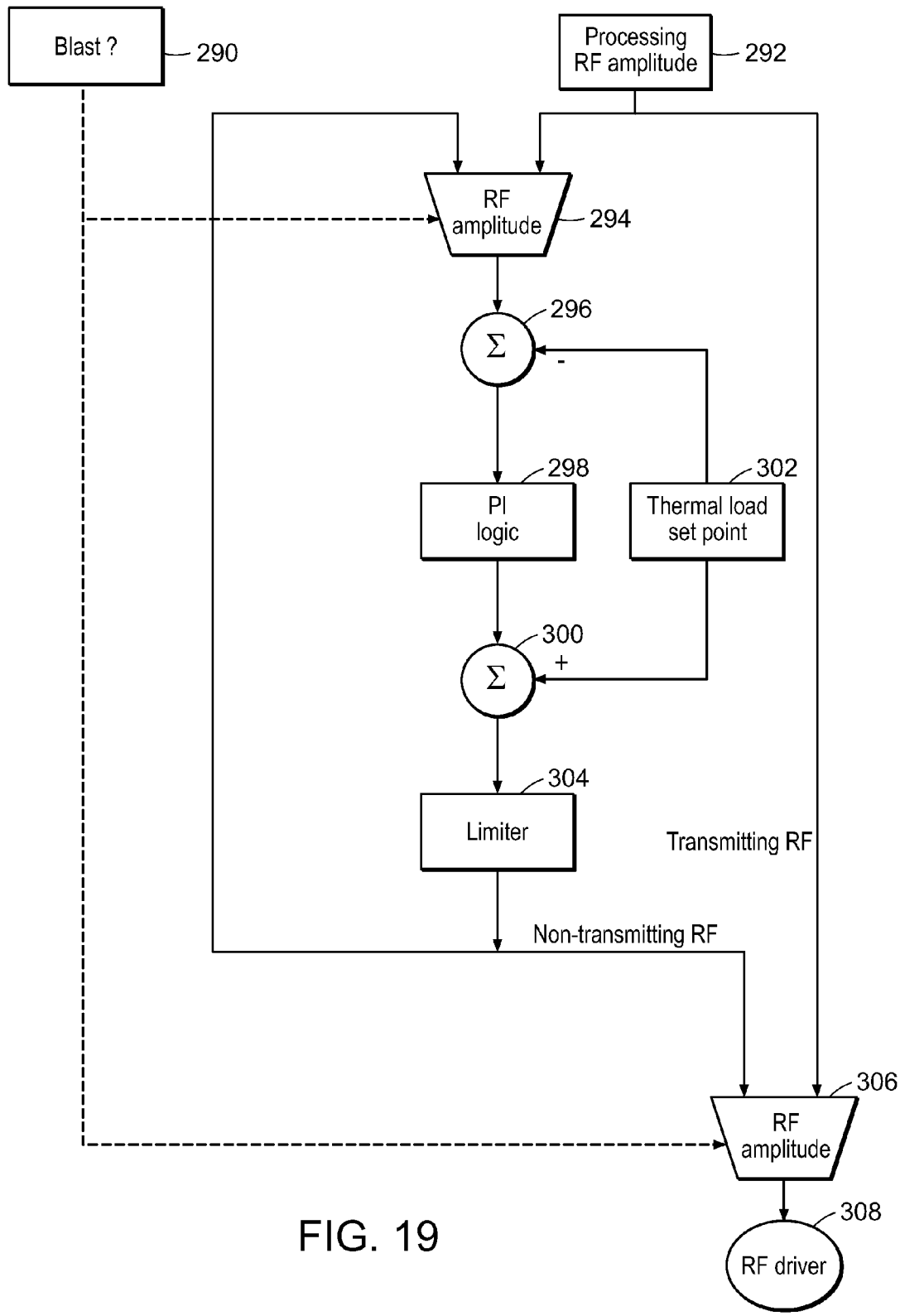
FIG. 19 shows an illustrative diagrammatic flowchart of RF amplitude processing in a system in accordance with certain embodiments of the invention.

In accordance with a further embodiment of the invention, a control loop may monitor the thermal load on the acousto-optic device with reference to a thermal load set point using a feedback system as shown in FIG. 19. The system of FIG. 19 applies the processing RF amplitude (shown at 292) as input to a first RF amplitude multiplexer 294 (that also receives feedback data) as well as to a second RF amplitude multiplexer (shown at 306) that directly controls an RF driver (shown at 308). In the event of the pulse being a non-target processing pulse based on the selector signal (shown at 290), the first RF amplitude multiplexer 294 provides output to a combiner (shown at 296) that also receives negative input regarding a thermal load set point (shown at 302). Servo control logic (e.g., proportional and integrator) (shown at 298) adjusts the non-transmitting RF pulse and the output is combined at combiner 300 that also receives positive input regarding the thermal load set point (again, shown at 302). A limiter is applied (shown at 304) to maintain the non-transmitting RF power within a specified range, for example between zero and the AOBD operational limit, and the adjusted non-transmitting RF pulse amplitude data is provided to both RF amplitude multiplexers (shown at 294 and 306). The RF amplitude multiplexer 306 combines the non-transmitting RF pulse adjustment data and the transmitting RF pulse data to provide the control signal for the RF driver 308.

Figure 20:
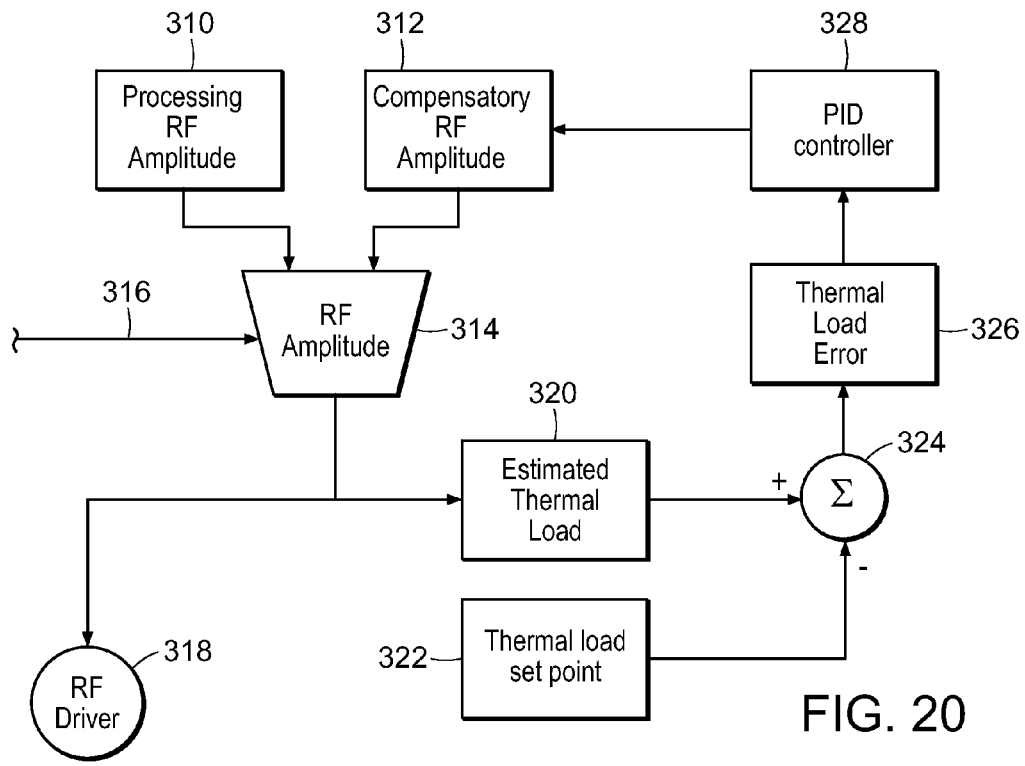
FIGS. 20-22 show an illustrative diagrammatic views of RF processing systems in accordance with certain embodiments of the invention.

In accordance with another embodiment of the invention, a control loop may be employed that maintains a stable predicted average thermal load of the combined transmitting RF pulses and compensatory non-transmitted RF pulses over a time period that is substantial less than a thermal time constant of the AOBD. FIG. 20 shows a control loop feedback system, for example, that provides processing RF amplitude data (shown at 310) and compensatory RF amplitude data (shown at 312) as input to an RF amplitude multiplexer (shown at 314), which also receives the blast signal (shown at 316) as discussed above. The output of the RF amplitude multiplexer is provided to an RF driver (as shown at 318) and is provided to an estimated thermal load routine (shown at 320), which compares it to a thermal load set point (shown at 322) using a combiner (shown at 324). The output of the combiner is provided to a thermal load error routine (shown at 326), which communicates with a proportional, integral, derivative (PID) controller (shown at 328) to provide the compensatory RF amplitude data (shown at 312) for the RF amplitude multiplexer.

The stable predicted average thermal load provides an approximately constant thermal load that stabilizes the AO device temperature. The control loop includes an RF power error signal that can be determined from the estimated average RF power relative to a pre-selected target value for average RF power. By integrating the error over time for example, compensatory RF pulses with prescribed energies, average power, amplitudes or durations are generated and the target RF power is maintained over the course of processing a substrate.

Figure 21:
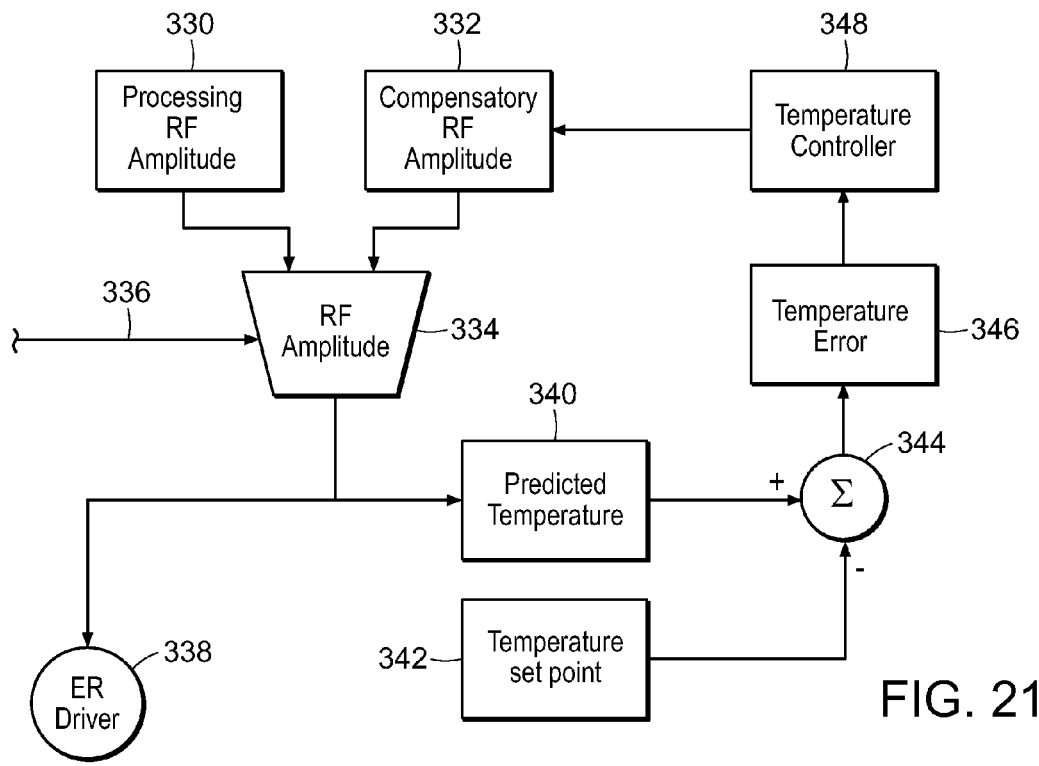

The control may operate as a set point thermostat or may include one or more of proportional, integral and differential terms to provide improved stability. FIG. 21 shows a control loop feedback system in accordance with another embodiment of the invention that provides processing RF amplitude data (shown at 330) and compensatory RF amplitude data (shown at 332) as input to an RF amplitude multiplexer (shown at 334), which also receives the blast signal (shown at 336) to select output ac discussed above. The output of the RF amplitude multiplexer is provided to an RF driver (as shown at 338) and is provided to a predicted temperature analysis routine (shown at 340), which compares it to a temperature set point (shown at 342) using a combiner (shown at 344). The output of the combiner is provided to a temperature error routine (shown at 346), which communicates with a temperature controller (shown at 348) to provide the compensatory RF amplitude data (shown at 332) for the RF amplitude multiplexer. The control may operate many orders of magnitude faster than the thermal time constant of the device.

Figure 22:
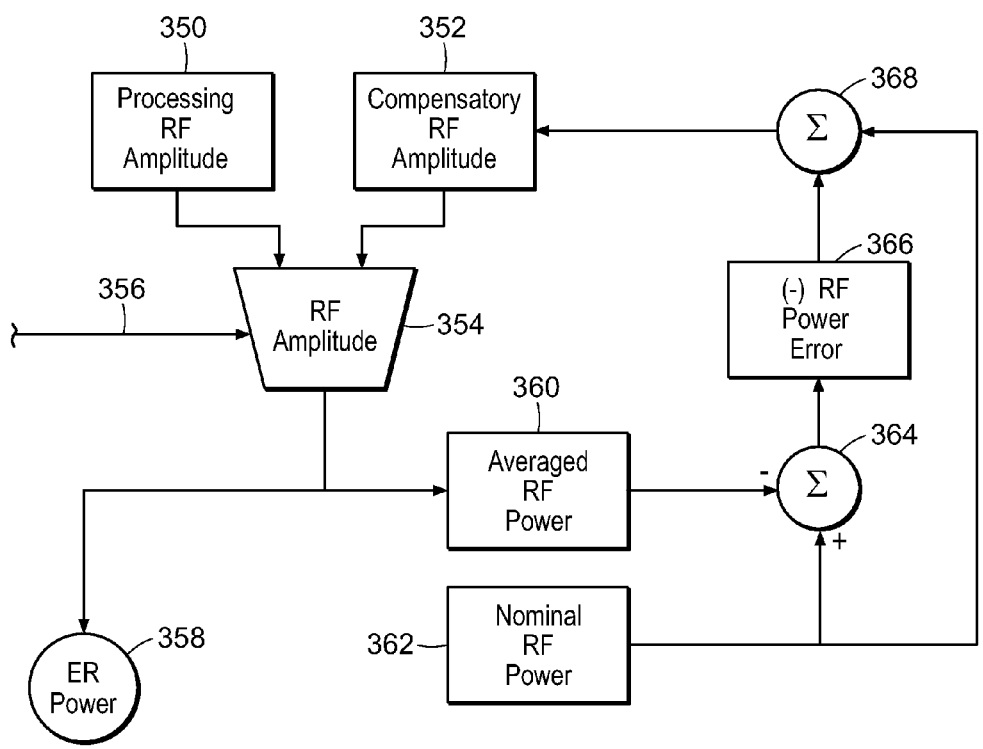

FIG. 22 shows a control loop feedback system in accordance with a further embodiment of the invention that provides processing RF amplitude data (shown at 350) and compensatory RF amplitude data (shown at 352) as input to an RF amplitude multiplexer (shown at 354), which also receives the blast signal (shown at 356) to select output as discussed above. The output of the RF amplitude multiplexer is provided to an RF driver (as shown at 358) and is provided to an averaged RF power analysis routine (shown at 360), which compares it to a nominal RF power (shown at 362) using a first combiner (shown at 364). The output of the first combiner is provided to a –RF power error routine (shown at 366), and the –RF power error routine provides its output to a second combiner (shown at 368), which also receives the nominal RF power, to provide the compensatory RF amplitude data (shown at 352) for the RF amplitude multiplexer.

It is expected that proportional and integral terms will provide suitable stability. The control may be implemented with digital electronics, and in addition to thermal stabilization, the use of digital electronics may provide digital calibration of RF amplitude vs. angle, RF amplitude vs. laser pulse power, or laser beam position vs. frequency.

Again, RF compensatory pulse energy may be based on maintaining constant average RF power. With a large number of RF pulses occurring within the thermal relaxation time of the AOBD, for example more than 10,000 pulses, this approach provides effective averaging over a large sample count of pulses. Compensatory pulse energy may be determined using a thermal model of the AOBD to maintain estimated temperature at a predetermined value. In this case, average loading could be used to maintain average temperature, high loading may be used for warming and low loading may be used for cooling. The average thermal loading may be about 200 milliwatts for typical processing duty cycles. Peak RF power may be as high as 4 watts in $TeO_2$ devices and 10 or more watts in quartz, germanium or other acoustic materials.

Figure 23:
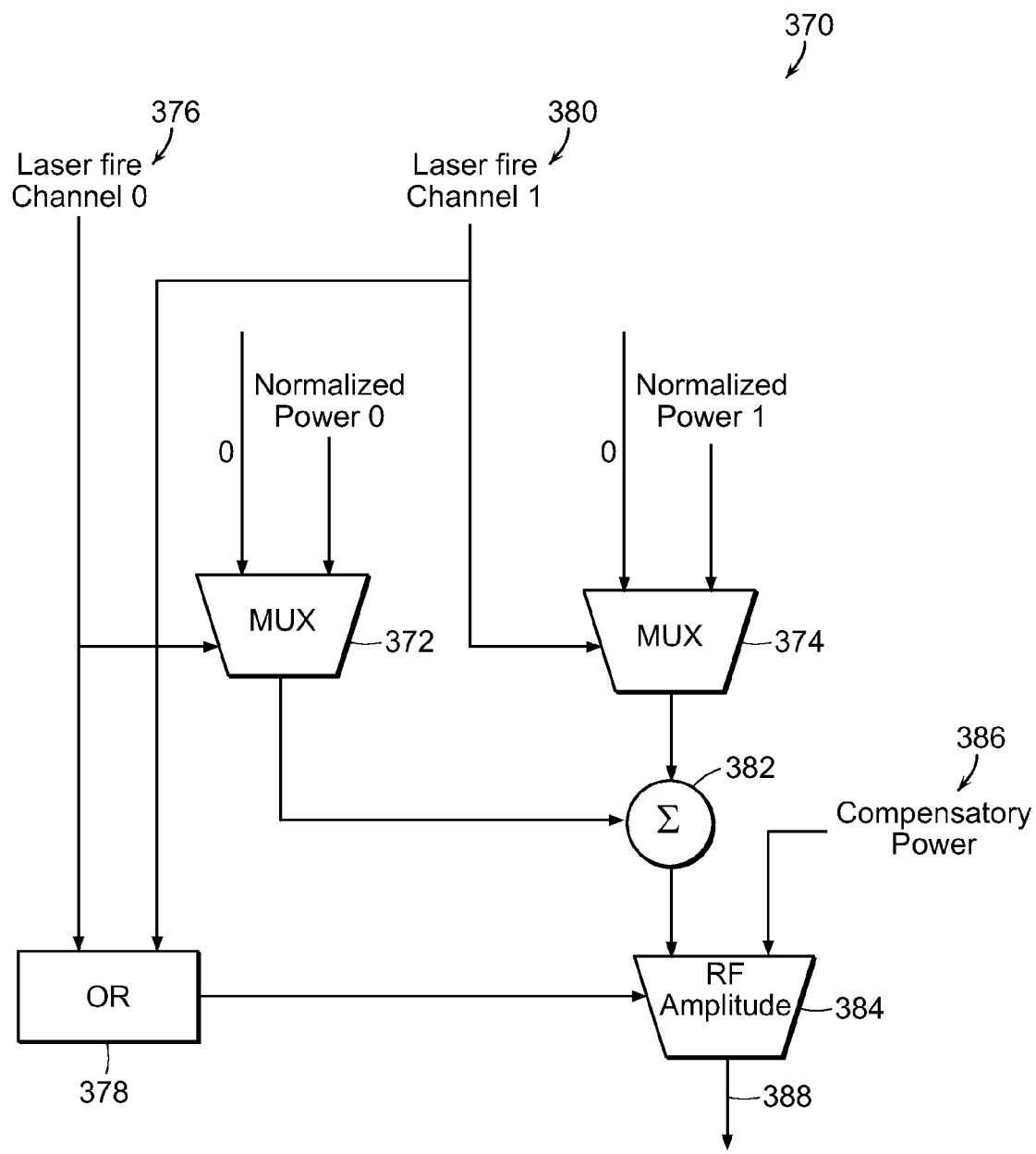
FIG. 23 shows an illustrative diagrammatic view of an AOBD power stabilization control system that employs a multi-channel digital input arrangement in accordance with certain embodiments of the invention.

FIG. 23 shows an example of a system in accordance with an embodiment of the invention that employs a multi-channel digital input arrangement 370 in an AOBD power stabilization system. In particular, the digital input arrangement uses a pair of normalized input signals and two multiplexers 372, 374 to provide an effective two bit four state input. In particular, a laser fire channel input 376 is provided to the multiplexer 372 as well as to a logical OR unit 378, and another laser fire channel input 380 is provided to the multiplexer 374 as well as the logical OR unit 378. The outputs of the multiplexers 372, 374 are provided to a combiner 382 that provides the combined output to an RF amplitude device 384. The RF amplitude device also receives a compensatory power input 386 as well as a control signal from the logical OR device 378, and provides an output power signal 388.

The system of FIG. 23 therefore provides two channels of input that are multiplexed with laser fire cycle input signals. When no laser fire signal is provided on either channel, the input is connected directly to the output for the power stabilization system. A multi-channel input may comprise more than two channels (e.g., 3 or more) with a suitable input arrangement and the multiple channel input can be applied as the processing RF amplitude input in any embodiments providing multiplexed processing RF amplitude and compensatory RE amplitudes.

Use of the optional AOM for laser pulse energy modulation may raise the operating temperature of the stabilized AOBD. This is because deflector RF amplitudes are not reduced when laser pulse energy is attenuated via the AOM. Further, if the AOM also provides energy correction to flatten energy over the processing field, deflector RF amplitude will not be reduced at the high efficiency deflection angles. With high RF power applied over the full processing duty cycle, AOBD device temperature will be increased.

Table 1 below shows the relative commanded laser pulse energy, AOBD efficiency and optical transmission in a demonstrative example of these AOBD RF power parameters during modulation at the center, middle and edge deflection angles.

|  | Center | Middle | Edge | Average |
|---|---|---|---|---|
| Command | 16% | 16% | 16% | 16% |
| Efficiency | 80% | 50% | 20% | 50% |
| RF power | 20% | 32% | 80% | 44% |
| Transmission | 16% | 16% | 16% | 16% |

The commanded laser pulse energy is show as 16% and the efficiency varies from 20% to 80%. Corresponding RE amplitude values are determined such that commanded energy divided by efficiency equals the RF amplitude. In this way, when the determined amplitude is applied, the transmission equals the commanded value and in this example, the average RF power applied is 44%.

Table 2 below shows the same deflections in a further demonstrative example when an external modulator is used to set the laser pulse energy to the command value.

|  | Center | Middle | Edge | Average |
|---|---|---|---|---|
| Command | 16% | 16% | 16% | 16% |
| Efficiency | 80% | 50% | 20% | 50% |
| RF power | 80% | 80% | 80% | 80% |
| AOM | 25% | 40% | 100% | 55% |
| Transmission | 16% | 16% | 16% | 16% |

In this case the RF amplitude of the AOBD is set to a constant 80% to yield 16% transmission at the field edge. The AOM varies from 25% to 100% to generate the commanded 16% transmission over the field. Comparing the resulting average applied RF from these tables, it is clear that use of the AOM in this example has raised the average loading of the AOBD from 44% to 80%. Thus, AOBD based laser pulse energy modulation allows a lower average RF power accommodating both the average device transmission across the deflection field and average RF duty cycle during processing. Parameters shown in Tables 1 and 2 are included as a convenience for the above comparison. Actual parameter values used processing with or with external modulation may vary.

The estimated average power may also be monitored for fault conditions such as levels outside of a maximum tolerance band. When an error is detected, system operation may be terminated or suspended until the average power is stabilized and in tolerance, or processing trajectory may be modified to accommodate stabile average power. In one embodiment, limiter 304 (of FIG. 19) detects an RF amplitude input outside a range of allowable amplitudes, for example less than zero or greater than a predetermined maximum RF amplitude, and provides a limited amplitude output until the input is within the allowable range.

It is expected that when selecting processing pulses from a constantly pulsed laser, the averaged duty cycle of selected working laser pulses will be substantially lower than 100% and compensatory RF pulses can be applied whenever processing laser pulses or alignment laser pulses are not demanded. It will be appreciated that the thermal time constant of the AO cell is on the order of many seconds and with a laser operating at 100's of KHz, such as 300 KHz many different processing system operations can be performed with differing laser pulse energy requirements within a time period that is less than the time constant of the AO device.

Therefore, compensatory RF energy, delivered intermittently during unused portions of the laser processing duty cycle can effectively provide thermal stabilization over an average time period that is less than the time constant of the device. For example, with a 200 mm/sec processing velocity, a 50 mm site could be traversed in about 0.25 seconds. Similarly, alignment routines which typically occur with greatly reduced laser pulse energy may run on the order of several tens of milliseconds. Not only can unused RF pulse periods during processing trajectory segments be used to balance thermal loading, but non-processing and non-alignment trajectory segments that comprise significant processing overhead can also be used to balance thermal loading. As the processing duty cycle increases, there may be limitations when insufficient compensatory RF pulses are available to balance thermal loading.

Selection of an optimized set point for average RF power and a resulting AO temperature may be based on a trajectory plan and expected transmission settings along the trajectory. Different set points may be determined based on other processing characteristics such as dense processing applications, skewed distributions of targets, differing processing energy levels or similar processing characteristics. For example, different types of memory devices may use different set points, or set points may be set to maximize or minimize AO device temperature for a given trajectory or set points may be chosen to maximize thermal stability. Generally, with the use of non-transmitting RF frequencies, lower set points can be used when compared to systems using constant high pulse rate RF loading and an additional laser pulse energy modulator (e.g., fixed deflection AOM) for pulse energy correction as discussed above.

Preferably, laser processing system calibration is performed with thermally stabilized deflectors. Correction for efficiency versus deflection angle and output pulse energy can be significantly improved operating at a single preset average power for example at 50% of the maximum RF power. With the average power stabilized, the deflector temperature is independent of delivered laser pulse energy. It has been observed that differences in AOBD transparency vs. deflection angle curves for different laser pulse energies at different (un-compensated) average RF powers may be about 10%, whereas these differences are reduced to about 1% when a constant average power is used to stabilize the deflector temperature over a range of laser pulse energies. In some cases, a single transparency correction curve may be sufficient over a range of laser pulse energies, simplifying energy calibration. Precise correction may employ both deflection RF frequency and RF amplitude as variables.

Further complications to effective AOBD thermal management include multiple axis AOBD beam delivery and operation over a 2-dimensional target field with different target types. For 2-axis beam deflection, with serial deflectors, overall transmission is the product of the transmission of each individual device. Stability may be maintained in multiple beam deflection axes simultaneously with a commanded transmission in each device. Further, various 2-dimensional effects can affect processing and may require different energy settings. For example polarization changes of the processing beam relative to orientation of elements to be processed may require different energy settings.

Figure 24A:
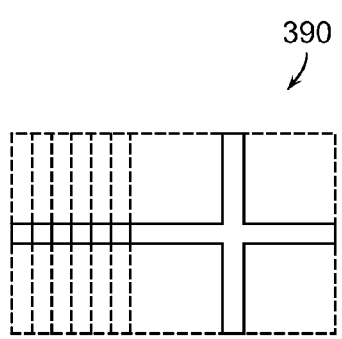
FIGS. 24A and 24B show illustrative diagrammatic views of processing field shapes in accordance with certain embodiments of the invention.
Figure 24B:
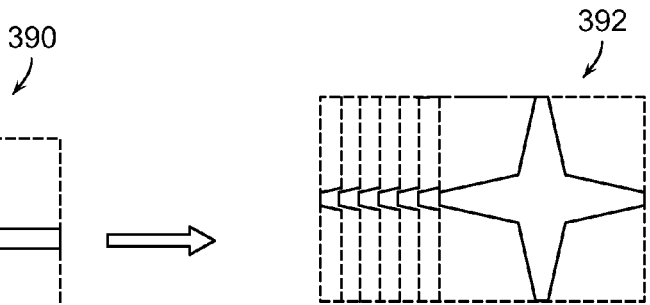

Processing along different substrate axes may indicate a different transmission split between multiple deflectors. For example with a cruciform shaped field (as shown at 390 in FIG. 24A) or a compass rose shaped field as shown at 392 in FIG. 24B, where low transmission field corners are avoided, a narrow field may have a high transmission and an orthogonally disposed wider field may have a low transmission together resulting in the overall transmission yielding the commanded pulse energy. For the cruciform shape, a raster along each of sequential columns or a random sequence alone each column may be used. Generally, column by column processing is advantageous within the narrow field, however if multiple columns fit with the field shape, links may be processed in different columns out of turn in the column sequence.

The cruciform field may improve blasting accuracy since the beam will be deflected only within areas having a high deflection accuracy. Since the beam is not deflected to the corners of the square field, blasting accuracy may be improved. A multi-row line sequence may be processed with the cruciform or compass rose shaped fields. With the compass rose shape, larger combined x-y offsets may be used near the center, with smaller combined x-y offsets used progressively toward the extremes of each axis.

With shaped fields, as the processing direction changes, high and low transmission efficiency roles may be reversed with the orientation of narrow and wide field axes relative to the processing direction. This in turn, may result in a reversed commanded transmission split while maintaining a constant overall beam transmission product between two serial devices. For example, when processing along a row oriented parallel to the x-axis, the x-axis deflector may have a narrow high efficiency deflection range and the y-axis deflector may have a wide low efficiency range. When processing parallel to the y-axis, the reversed roles would be a wide low efficiency range for the x-axis deflector and a narrow high efficiency range for the y-axis. Even during a single processing operation therefore, while maintaining a constant delivered pulse energy, the commanded transmission in a single AOBD device may change, and the thermal loading on the AOBD device may change significantly.

Figure 25:
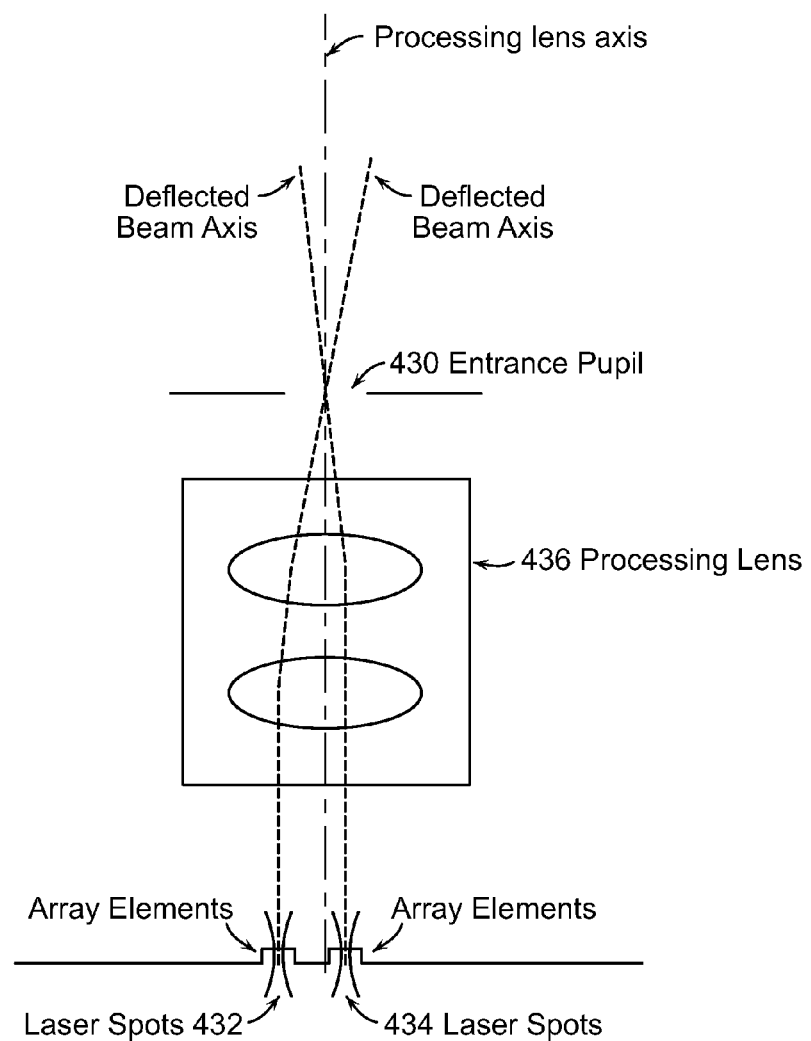
FIG. 25 shows an illustrative diagrammatic view of a deflected beam axis in accordance with certain embodiments of the invention.

Aspects of certain embodiments may be practiced in a single path optical system where all deflected beams are incident on the same set of optical components. In a single path system deflected beams may be offset from an optical path axis propagating with non-collinear beam axes but generally each beam propagates in the same direction in the same sequence near the optical path axis through common optical elements. The non-collinear beams are generally centered with respect to the entrance pupil of the laser processing lens so that beam positioning at each target position in the field of view is telecentric. As shown in FIG. 25, at the entrance pupil 430, each deflected beam will propagate along a vector direction with an azimuth angle and an elevation angle relative to the lens axis. Laser spots 432, 434, generally diffraction limited laser beam waists, formed at the focal plane of the lens at the array are offset from the lens axis with an orientation corresponding to the azimuth angle and a radial distance corresponding to the lens focal length times the elevation angle. The beam positioning system may include various adjusters for beam alignment, which may among other things, align the beams to the center of the entrance pupil of the processing lens 436.

Figure 26:
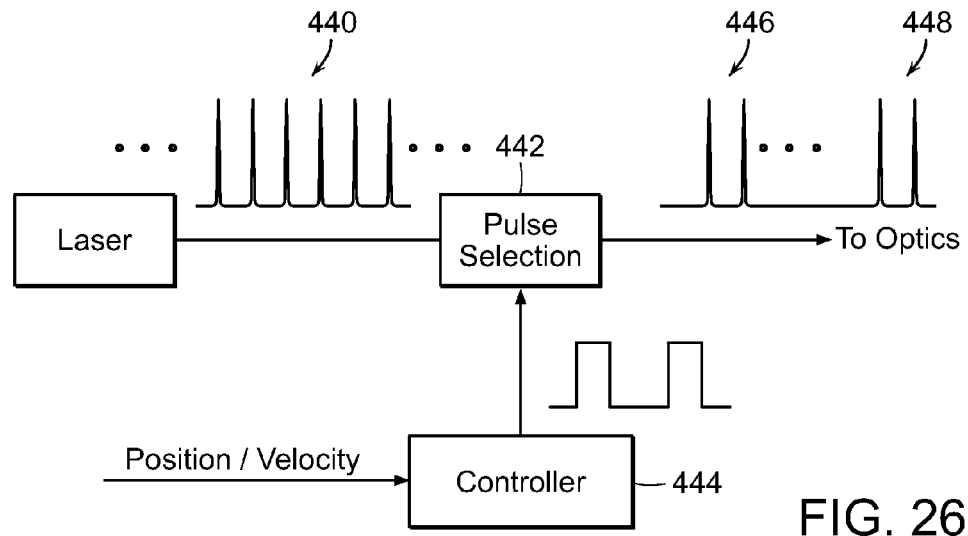
FIG. 26 shows an illustrative diagrammatic view of a multiple pulse laser processing system in accordance with certain embodiments of the invention.

Although the above embodiment was described in terms of single pulse link processing, systems of the invention may also be employed in link blowing systems that apply multiple pulses to each link to sever the link. FIG. 26 shows a system that applies a burst or sequence of two pulses 440 to each link. In this embodiment a controller 444 is used to cause the pulse selector 442 to select groups of pulses 444, 446 rather than individual pulses for link processing. In some embodiments, the laser itself produces separated bursts of pulses where the pulse to pulse separation within the burst is much less than the separation between bursts. In these embodiments, the pulse picker 442 selectively passes or blocks pulse bursts. Other known embodiments use multiple lasers or split and re-combined pulses to produce a variety of intensity profiles of the laser energy applied to a link for processing. It will therefore be appreciated that all of the discussion throughout this document related to applying a pulse to a target structure for processing includes applying a sequence of pulses, pulse groups, combined pulses, or pulse bursts, or any other irradiance intensity profile for performing a complete or partial target processing function. In many embodiments, the pulse picker 442 is an acousto-optic modulation device, but may be an electro-optic switch, a fast steering mirror or any other type of optical switch with sufficient speed and accuracy.

Figure 27:
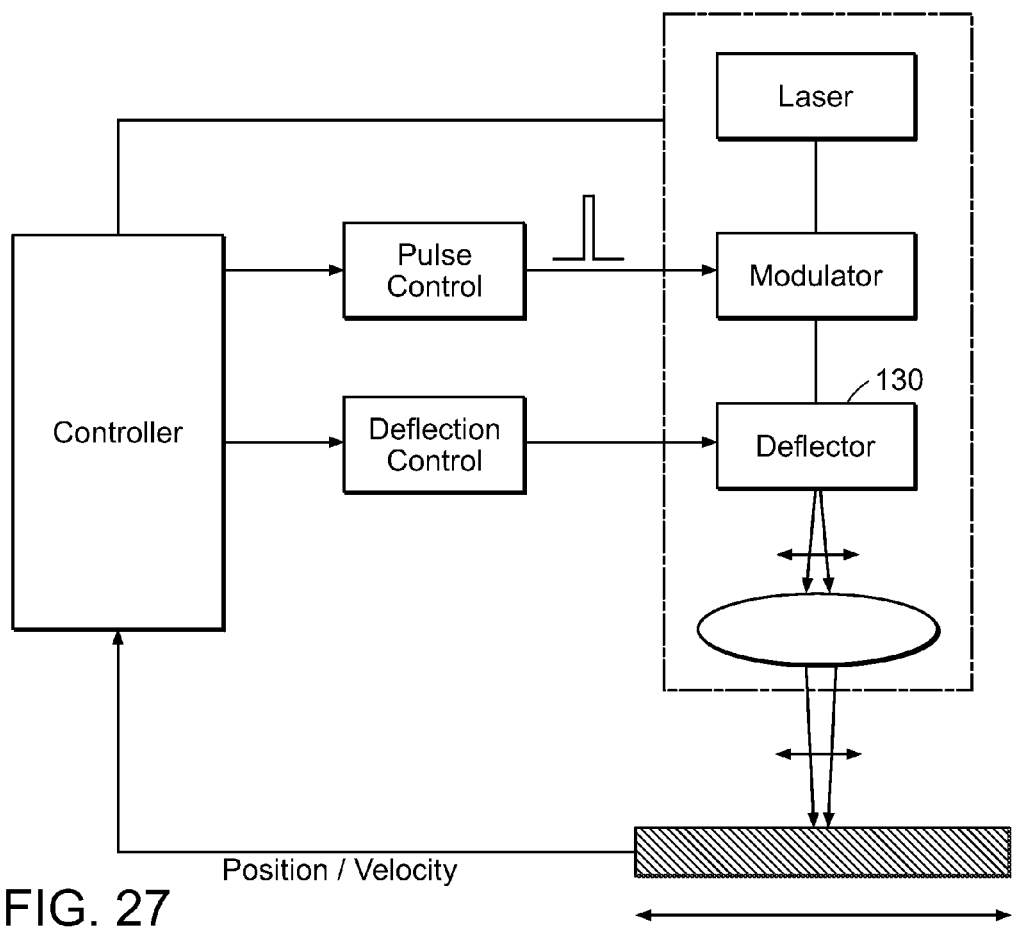
FIG. 27 shows an illustrative diagrammatic view of a laser processing system configured to correct relative motion during link processing in accordance with certain embodiments of the invention.

With regard to the use of a high speed deflector and with reference to FIG. 27, see previously incorporated by reference U.S. Patent Application Publication No. 2009/0095722, and in particular FIG. 19 and the accompanying paragraphs including ¶0130 through ¶0146 thereof.

The minimum duration of each transmitting RF pulse is determined by the acoustic transit time across the AOBD acoustic window. This RF pulse duration corresponds to the shortest laser pulse repetition period and the highest laser pulse repetition frequency. For reduced laser pulse repetition frequencies, the RF duty cycle can be reduced while maintaining the minimum RF pulse duration. Extended RF pulse duration up to the laser pulse repetition period can be provided in the resulting inter-pulse intervals to increase RF power for a given RF pulse. This RF pulse duration extension may be used in addition to non-transmitting RF pulses to further stabilize the AOBD. In some cases, non-transmitting time-displaced RF pulses are possible as well, however whenever the RF duty cycle for sequential RF pulses exceeds 50%, this is difficult. To some extent, by increasing RF amplitude of non-transmitting RF pulses and shortening non-transmitting RF duration, time-displace RF pulses may use less than 50% of the duty cycle.

For example when an RF pulse duration is ⅔ of the laser repetition period, an additional RF pulse or RF pulse extension at 100% RF amplitude could be applied over the un-used ⅓ of the duty cycle and the added RF pulse energy would correspond to 50% RF amplitude over the normal ⅔ period. A decreased laser pulse repetition rate may correspond with a reduced trajectory velocity and processing may be slowed to accommodate thermal stabilization, for example when average thermal loading is not sufficiently uniform to allow stabilization at maximum laser PRF.

In accordance with various embodiments therefore, the invention provides a method of laser processing with a thermally stabilized acousto-optic beam deflector. The method includes the steps of generating a sequence of RF pulses corresponding to a sequence of laser pulses having a laser pulse repetition rate, the RF pulses including transmitting RF pulses at transmitting RF frequencies and non-transmitting RF pulses at non-transmitting RF frequencies for causing the sequence of laser pulses to be deflected in respective transmitting and non-transmitting directions, each RF pulse comprising an RF frequency, an RF amplitude and a duration; controlling each RF pulse such that the sequence of RF pulses provides a modulated RF drive signal that is modulated to provide a balanced thermal loading on the acousto-optic deflector; applying the modulated RF drive signal to the acousto-optic deflector; and deflecting at least one laser pulse with the acousto-optic deflector using the modulated RF drive signal to irradiate a selected target position with a predetermined pulse energy.

In further embodiments, the step of controlling each RF pulse further comprises controlling the amplitude and duration of each RF pulse. In a further embodiment, the duration of each RE pulse comprises at least a 50% duty cycle at the laser repetition rate. In a further embodiment, the laser pulse repetition rate is greater than 100 KHz. In a further embodiment, the duration of each transmitting RF pulse is a minimum duration corresponding to efficient laser pulse transmission comprising a substantially 100% duty cycle, whereby the laser pulse repetition rate is maximized.

In a further embodiment, the laser pulse repetition rate is approximately 300 KHz. In a further embodiment, the step of controlling the duration of each RF pulse includes generating RF pulses with respective duty cycles in the range of 50% to 100% at the laser repetition rate and controlling the duration of non-transmitting RF pulses to provide a balanced thermal loading on the acousto-optic deflector. In a further embodiment, the modulated drive signal provides substantially constant averaged RF power to thermally stabilize the acousto-optic beam deflector.

In a further embodiment, the step of controlling further includes timing sequential RF pulse generation in advance of corresponding laser pulse triggering to account for a propagation delay in the acousto-optic deflector and modulating RF pulse amplitude to simultaneously propagate multiple amplitude modulated acoustic pulses in the deflector. In a further embodiment, the step of modulating RF pulse amplitude provides at least 2 non-transmitting RF pulses having different RF pulse energies to thermally stabilize the acousto-optic beam deflector. In a further embodiment, the step of modulating RF amplitude provides at least 2 transmitting RF pulses having different RF pulse energies.

In a further embodiment, the method further includes the steps of storing an RF power reference value, predicting average RF power applied to the acousto-optic beam deflector, comparing the prediction with the reference value and determining RF pulse energy of at least one respective non-transmitting RF pulse based on the comparison.

In a further embodiment, the method further includes the step of storing correction table values for optical transmission of the deflector versus deflection RF frequency over a transmitting range of deflector RF frequencies, wherein the step of controlling includes modulating transmitting RF pulse amplitude used on deflection frequency and a corresponding stored correction table value.

In a further embodiment, the method further includes operating a laser processing system to move a substrate relative to a deflected laser beam and delivering compensated laser pulse energy to selected target positions on the substrate within a predetermined laser pulse energy tolerance. In a further embodiment, the method further includes terminating laser processing when calculated acousto-optic beam deflector RF power exceeds a predetermined error tolerance.

In accordance with a further embodiment, the invention provides a method of providing thermal stability in an acousto-optic beam deflector. The method includes the steps of: providing transmitting RF pulses to the acousto-optic beam deflector to provide that the acousto-optic beam deflector directs a processing laser pulse along an optical path terminating at a target substrate; and providing non-transmitting RF pulses to the acousto-optic beam deflector to provide that the acousto-optic beam deflector directs a non-processing laser pulse along an optical path that terminates without reaching the target substrate, wherein each non-transmitting RF pulse has a pulse characteristic that is selected to provide thermal stability of the acousto-optic beam deflector.

In a further embodiment, the pulse characteristic is an amplitude of the non-transmitting RF pulse. In a further embodiment, the pulse characteristic is a frequency of the non-transmitting RF pulse. In a further embodiment, the pulse characteristic is a pulse width of the non-transmitting RF pulse.

In a further embodiment, the method further includes the step of monitoring the RF power in the acousto-optic beam deflector to provide the pulse characteristic of the non-transmitting RF pulse. In a further embodiment, the method further includes the step of monitoring the thermal load on the acousto-optic beam deflector to provide the pulse characteristic of the non-transmitting RF pulse. In a further embodiment, the method further includes the step of monitoring the temperature of the acousto-optic beam deflector to provide the pulse characteristic of the non-transmitting RF pulse.

In a further embodiment, the invention provides a thermally stabilized high speed laser processing system for deflecting laser pulses to selected targets within a laser processing field according to a laser processing sequence. The system includes: a controller for executing a sequence of laser processing commands and for thermally stabilizing system components, the commands including a delivered laser pulse energy command and a delivered laser pulse position command regarding a laser pulse position within the laser processing field, the controller generating one or more deflector control signals responsive to said laser processing commands to thermally stabilize at least one system component; and at least one RF signal generator that is configured to receive a deflector control signal and to generate a respective RF drive signal, each RF drive signal comprising a sequence of transmitting and non-transmitting RF pulses, each transmitting RF pulse characterized by a predetermined transmitting frequency corresponding to a selected target coordinate within the laser processing field and characterized by a respective predetermined thermal load, and each non-transmitting RF pulse characterized by respective non-transmitting frequencies and respective compensatory thermal loads, whereby each RE drive signal provides a stabilized thermal load of transmitting RF pulses and compensatory non-transmitting RF pulses in at least one acousto-optic modulator; wherein the at least one acousto-optic modulator is configured to receive a respective RF drive signal and to deflect laser pulses according to the laser processing sequence to irradiate predetermined target coordinates with predetermined laser pulse energy.

In a further embodiment, each RF pulse is further characterized by having an RF amplitude that is responsive to the deflector control signal. In a further embodiment, the controller further includes means for predetermining a thermal load estimate for each RF pulse. In a further embodiment, the controller further includes means for converting commanded pulse energy to a corresponding corrected RF amplitude based on the selected target coordinate and associated predetermined RF amplitude correction coefficients.

In a further embodiment, the controller further includes means for generating a thermally balanced deflector control signal based on a comparison of calculated RF power to a predetermined value. In a further embodiment, the RF signal generator further includes an RF power amplifier. In a further embodiment, the system further includes an RF cable and impedance matching components for delivering RF power from the RF power amplifier to the acousto-optic deflector.

In a further embodiment, the acousto-optic temperature is a stabilized elevated temperate. In a further embodiment, the stabilized thermal load comprises substantially constant RF power. In a further embodiment, the controller includes RF pulse width modulation means for varying thermal loads. In a further embodiment, the controller includes RF pulse amplitude modulation means for varying thermal loads. In a further embodiment, the controller includes a configured FPGA.

Those skilled in the art will appreciate that numerous modifications and variations may be made to the above disclosed embodiments without departing from the spirit and scope of the invention.

What is claimed is:

1. A method of laser processing with a thermally stabilized acousto-optic beam deflector, said method comprising the steps of:
   generating a sequence of RF pulses corresponding to a sequence of laser pulses having a laser pulse repetition rate, the RF pulses including transmitting RF pulses at transmitting RF frequencies and non-transmitting RF pulses at non-transmitting RF frequencies for causing the sequence of laser pulses to be deflected in respective transmitting and non-transmitting directions, each RF pulse comprising an RF frequency, an RF amplitude, and a duration;
   controlling each RF pulse such that the sequence of RF pulses provides a modulated RF drive signal that is modulated to provide a balanced thermal loading on the acousto-optic deflector, wherein the amplitude and duration of each RF pulse is controlled;
   applying the modulated RE drive signal to the acousto-optic deflector; and
   deflecting at least one laser pulse with the acousto-optic deflector using the modulated RF drive signal to irradiate a selected target position with a predetermined pulse energy.

2. The method as claimed in claim 1, wherein the duration of each RF pulse comprises at least a 50% duty cycle at the laser repetition rate.

3. The method as claimed in claim 1, wherein the laser pulse repetition rate is greater than 100 KHz.

4. The method as claimed in claim 1, wherein the duration of each transmitting RF pulse is a minimum duration corresponding to efficient laser pulse transmission comprising a substantially 100% duty cycle, whereby the laser pulse repetition rate is maximized.

5. The method as claimed in claim 1, wherein the laser pulse repetition rate is approximately 300 KHz.

6. The method as claimed in claim 1, wherein the modulated drive signal provides substantially constant averaged RF power to thermally stabilize the acousto-optic beam deflector.

7. The method as claimed in claim 1, wherein said method further includes steps of storing an RF power reference value, predicting average RF power applied to the acousto-optic beam deflector, comparing the prediction with the reference value and determining RF pulse energy of at least one respective non-transmitting RF pulse based on the comparison.

8. The method as claimed in claim 1, wherein said method further includes the step of storing correction table values for optical transmission of the deflector versus deflection RF frequency over a transmitting range of deflector RF frequencies, wherein the step of controlling includes modulating transmitting RF pulse amplitude based on deflection frequency and a corresponding stored correction table value.

9. The method as claimed in claim 1, wherein said method further includes operating a laser processing system to move a substrate relative to a deflected laser beam and delivering compensated laser pulse energy to selected target positions on the substrate within a predetermined laser pulse energy tolerance.

10. The method as claimed in claim 1, wherein said method further includes terminating laser processing when calculated acousto-optic beam deflector RF power exceeds a predetermined error tolerance.

11. The method as claimed in claim 1, wherein said step of controlling further includes timing sequential RF pulse generation, in advance of corresponding laser pulse triggering to account for a propagation delay in the acousto-optic deflector and modulating RF pulse amplitude to simultaneously propagate multiple amplitude modulated acoustic pulses in the deflector.

12. The method as claimed in claim 11, wherein said step of modulating RF pulse amplitude provides at least 2 non-transmitting RF pulses having different RF pulse energies to thermally stabilize the acousto-optic beam deflector.

13. The method as claimed in claim 11, wherein said step of modulating RF amplitude provides at least 2 transmitting RF pulses having different RF pulse energies.

14. A method of providing thermal stability in an acousto-optic beam deflector, said method comprising the steps of:
   providing transmitting RF pulses to the acousto-optic beam deflector to provide that the acousto-optic beam deflector directs a processing laser pulse along an optical path terminating at a target substrate; and
   providing non-transmitting RF pulses to the acousto-optic beam deflector to provide that the acousto-optic beam deflector directs a non-processing laser pulse along an optical path that terminates without reaching the target substrate, wherein each non-transmitting RF pulse has a pulse characteristic that is selected to provide thermal stability of the acousto-optic beam deflector, wherein said pulse characteristic comprises an amplitude of the non-transmitting pulse.

15. The method as claimed in claim 14, wherein said pulse characteristic also comprises a frequency of the non-transmitting RF pulse.

16. The method as claimed in claim 14, wherein said pulse characteristic also comprises a pulse width of the non-transmitting RF pulse.

17. The method as claimed in claim 14, wherein said method further includes the step of monitoring the RF power in the acousto-optic beam deflector to provide the pulse characteristic of the non-transmitting RF pulse.

18. The method as claimed in claim 14, wherein said method further includes the step of monitoring the thermal load on the acousto-optic beam deflector to provide the pulse characteristic of the non-transmitting RF pulse.

19. The method as claimed in claim 14, wherein said method further includes the step of monitoring the temperature of the acousto-optic beam deflector to provide the pulse characteristic of the non-transmitting RF pulse.

20. A method of laser processing with a thermally stabilized acousto-optic beam deflector, said method comprising the steps of:
   generating a sequence of RF pulses corresponding to a sequence of laser pulses having a laser pulse repetition rate, the RF pulses including transmitting RF pulses at transmitting RF frequencies and non-transmitting RF pulses at non-transmitting RF frequencies for causing the sequence of laser pulses to be deflected in respective transmitting and non-transmitting directions, each RF pulse comprising an RF frequency, an RF amplitude, and a duration;

controlling each RF pulse such that the sequence of RF pulses provides a modulated RF drive signal that is modulated to provide a balanced thermal loading on the acousto-optic deflector, wherein the RF pulses are generated with respective duty cycles in the range of 50% to 100% at the laser repetition rate, and wherein the duration of non-transmitting RF pulses are controlled to provide the balanced thermal loading on the acousto-optic deflector;

applying the modulated RF drive signal to the acousto-optic deflector; and deflecting at least one laser pulse with the acousto-optic deflector using the modulated RF drive signal to irradiate a selected target position with a predetermined pulse energy.

21. The method as claimed in claim 20, wherein the laser pulse repetition rate is greater than 100 KHz.

22. The method as claimed in claim 20, wherein the duration of each transmitting RF pulse is a minimum duration corresponding to efficient laser pulse transmission comprising a substantially 100% duty cycle, whereby the laser pulse repetition rate is maximized.

23. The method, as claimed in claim 20, wherein the modulated drive signal provides substantially constant averaged RF power to thermally stabilize the acousto-optic beam deflector.

24. The method as claimed in claim 20, wherein said method further includes steps of storing an RF power reference value, predicting average RF power applied to the acousto-optic beam deflector, comparing the prediction with the reference value and determining RF pulse energy of at least one respective non-transmitting RF pulse based on the comparison.

25. The method as claimed in claim 20, wherein said method further includes the step of storing correction table values for optical transmission of the deflector versus deflection RF frequency over a transmitting range of deflector RF frequencies, wherein the step of controlling includes modulating transmitting RE pulse amplitude based on deflection frequency and a corresponding stored correction table value.

26. The method as claimed in claim 20, wherein said method further includes operating a laser processing system to move a substrate relative to a deflected laser beam and delivering compensated laser pulse energy to selected target positions on the substrate within a predetermined laser pulse energy tolerance.

27. The method as claimed in claim 20, wherein said method further includes terminating laser processing when calculated acousto-optic beam deflector RE power exceeds a predetermined error tolerance.

28. The method as claimed in claim 20, wherein said step of controlling further includes timing sequential RF pulse generation in advance of corresponding laser pulse triggering to account for a propagation delay in the acousto-optic deflector and modulating RF pulse amplitude to simultaneously propagate multiple amplitude modulated acoustic pulses in the deflector.

29. The method as claimed in claim 28, wherein said step of modulating RF pulse amplitude provides at least 2 non-transmitting RF pulses having different RF pulse energies to thermally stabilize the acousto-optic beam deflector.

30. The method as claimed in claim 28, wherein said step of modulating RF amplitude provides at least 2 transmitting RF pulses having different RF pulse energies.

31. A method of providing thermal stability in an acousto-optic beam deflector, said method comprising the steps of:

providing transmitting RF pulses to the acousto-optic beam deflector to provide that the acousto-optic beam deflector directs a processing laser pulse along an optical path terminating at a target substrate; and providing non-transmitting RF pulses to the acousto-optic beam deflector to provide, that the acousto-optic beam deflector directs a non-processing laser pulse along an optical path that terminates without reaching the target substrate, wherein each non-transmitting RE pulse has a pulse characteristic that is selected to provide thermal stability of the acousto-optic beam deflector, wherein said pulse characteristic comprises a pulse width of the non-transmitting RF pulse.

32. The method as claimed in claim 31, wherein said pulse characteristic also comprises a frequency of the non-transmitting RF pulse.

33. The method as claimed in claim 31, wherein said method further includes the step of monitoring the RF power in the acousto-optic beam deflector to provide the pulse characteristic of the non-transmitting RF pulse.

34. The method as claimed in claim 31, wherein said a method further includes the step of monitoring the thermal load on the acousto-optic beam deflector to provide the pulse characteristic of the non-transmitting RF pulse.

35. A method of providing thermal stability in an acousto-optic beam deflector, said method comprising the steps of:

providing transmitting RF pulses to the acousto-optic beam deflector to provide that the acousto-optic beam deflector directs a processing laser pulse along an optical path terminating at a target substrate; and providing non-transmitting RF pulses to the acousto-optic beam deflector to provide that the acousto-optic beam deflector directs a non-processing laser pulse along an optical path that terminates without reaching the target substrate, wherein each non-transmitting RF pulse has a pulse characteristic that is selected to provide thermal stability of the acousto-optic beam deflector, wherein said pulse characteristic comprises a frequency of the non-transmitting RF pulse.

\* \* \* \* \*